(12) United States Patent
Matsuo et al.

(10) Patent No.: US 10,318,362 B2
(45) Date of Patent: Jun. 11, 2019

(54) INFORMATION PROCESSING APPARATUS, INFORMATION PROCESSING METHOD, AND NON-TRANSITORY COMPUTER-READABLE STORAGE MEDIUM

(71) Applicant: FUJITSU LIMITED, Kawasaki-shi, Kanagawa (JP)

(72) Inventors: Yuki Matsuo, Bunkyo (JP); Munenori Maeda, Yokohama (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/954,111

(22) Filed: Apr. 16, 2018

(65) Prior Publication Data
US 2018/0307548 A1 Oct. 25, 2018

(30) Foreign Application Priority Data
Apr. 19, 2017 (JP) ................................ 2017-082660

(51) Int. Cl.
*G06F 9/54* (2006.01)
(52) U.S. Cl.
CPC .............. *G06F 9/546* (2013.01); *G06F 9/542* (2013.01)
(58) Field of Classification Search
None
See application file for complete search history.

(56) References Cited

U.S. PATENT DOCUMENTS

| | | | |
|---|---|---|---|
| 2004/0049774 A1 | 3/2004 | Boyd et al. | |
| 2011/0246582 A1* | 10/2011 | Dozsa | G06F 9/546 709/206 |
| 2012/0254484 A1* | 10/2012 | Yang | G06F 9/545 710/47 |
| 2012/0260261 A1* | 10/2012 | Tillier | G06F 9/52 719/313 |
| 2015/0326661 A1 | 11/2015 | Nakamura et al. | |
| 2018/0307548 A1* | 10/2018 | Matsuo | G06F 9/546 |

FOREIGN PATENT DOCUMENTS

| | | |
|---|---|---|
| JP | 2005-538588 | 12/2005 |
| JP | 2015-216450 | 12/2015 |

\* cited by examiner

*Primary Examiner* — Tuan C Dao
(74) *Attorney, Agent, or Firm* — Staas & Halsey LLP

(57) ABSTRACT

An information processing apparatus including a memory that stores correspondence information, the correspondence information indicating a correspondence between a plurality of first identifiers and a plurality of combinations of one of a plurality of first threads and one of a plurality of second threads, respectively, and a processor coupled to the memory and the processor configured to execute a process including storing, into a queue, a completion notification corresponding to received data upon a reception of the received data, the received data including a second identifier indicating a combination of transmission source thread among the plurality of second threads and a destination thread among the plurality of first threads, retrieving the completion notification stored in the queue, specifying a third thread among the plurality of first threads based on the second identifier included in the received data and the correspondence information, and transmitting the received data to the third thread.

7 Claims, 23 Drawing Sheets

INFORMATION PROCESSING APPARATUS, INFORMATION PROCESSING METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-82660, filed on Apr. 19, 2017, the entire contents of which are incorporated herein by reference.

FIELD

The embodiments discussed herein are related to an information processing apparatus, an information processing method, and a non-transitory computer-readable storage medium.

BACKGROUND

InfiniBand (registered trademark) is known as a standard of a bus for communicating between apparatuses. In communication using InfiniBand, a queue in which a completion notification indicating that a requested communication processing has been completed is stored is used in each of a transmitting-side apparatus and a receiving-side apparatus. This queue is called a completion queue (CQ). For example, a thread executed on the receiving-side apparatus requests polling for the CQ after requesting the reception of data. In a case where the requested data is received from the transmitting-side apparatus, the completion notification is stored in the CQ. In a case where the thread has acquired the completion notification from the CQ by polling, the thread recognizes that the reception of the data is completed.

As an example of a technique relating to InfiniBand, there has been proposed an information processing apparatus that determines whether a queue pair (QP) number is added to a received message and enhances check efficiency by checking the QP number only in a case where the QP number is added to the received message.

As an example of a technique relating to a network interface, a queue pair shared by each of a main network interface controller (NIC) corresponding to a remote direct memory access (RDMA) and an alternative NIC is generated, and in response to the detection of a switchover event, there is proposed a method of switching the handling of the queue pair from the main NIC to the alternative NIC.

Japanese Laid-open Patent Publication No. 2015-216450 and Japanese National Publication of International Patent Application No. 2005-538588 are examples of the related art.

SUMMARY

According to an aspect of the invention, an information processing apparatus including a memory that stores correspondence information, the correspondence information indicating a correspondence between a plurality of first identifiers and a plurality of combinations of one of a plurality of first threads and one of a plurality of second threads, respectively, the plurality of first threads running on the information processing apparatus, the plurality of second threads running on another information processing apparatus, and a processor coupled to the memory and the processor configured to execute a process, the process including storing, into a queue, a completion notification corresponding to received data upon a reception of the received data, the received data including a second identifier indicating a combination of transmission source thread among the plurality of second threads and a destination thread among the plurality of first threads, retrieving the completion notification stored in the queue, specifying, upon the retrieving, a third thread among the plurality of first threads based on the second identifier included in the received data and the correspondence information, and transmitting the received data to the third thread.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Herein, there is considered a case where communication between a plurality of threads executed on the transmitting-side apparatus and a plurality of threads executed on the receiving-side apparatus is performed by using InfiniBand. In this case, there is provided a method in which a connection between threads for each combination of threads between which communication is performed is established and the aforementioned CQ for each established connection is prepared, which is the simplest method. The reason is that, according to this method, a receiving-side thread may acquire a completion notification addressed to the receiving-side thread itself from the CQ only by polling for the CQ corresponding to the receiving-side thread itself.

However, there are the following problems in this method. There is a possibility that, as the number of established connections increases, a delay time after the thread requests the reception of data and until the thread acquires a completion notification from the CQ becomes longer. In a case where there is a difference in the number of communication connections among these connections, with respect to a CQ corresponding to a connection with frequent communication, the number of completion notifications stored in the CQ per unit time increases, even if the delay time becomes longer. Therefore, as the frequency of communication connections increases, a probability that the receiving-side thread may acquire a completion notification in a case where the receiving-side thread performs polling for the CQ increases.

Conversely, as the frequency of communication connections decreases, a probability that the receiving-side thread may acquire a completion notification in a case where the receiving-side thread performs polling for the CQ decreases. A thread of such a connection with a low frequency of communication connections performs many unnecessary polling operations by which a completion notification may not be acquired. Therefore, there are problems that resources such as processors and memories are wasted, and processing efficiency is low.

In one aspect, the object of the embodiments is to provide an information processing apparatus, an information processing method, and an information processing program capable of improving the efficiency of the reception processing of data.

In one aspect, it is possible to improve the efficiency of the reception processing of data.

Hereinafter, the embodiments are described with reference to the drawings.

First Embodiment

Figure 1:
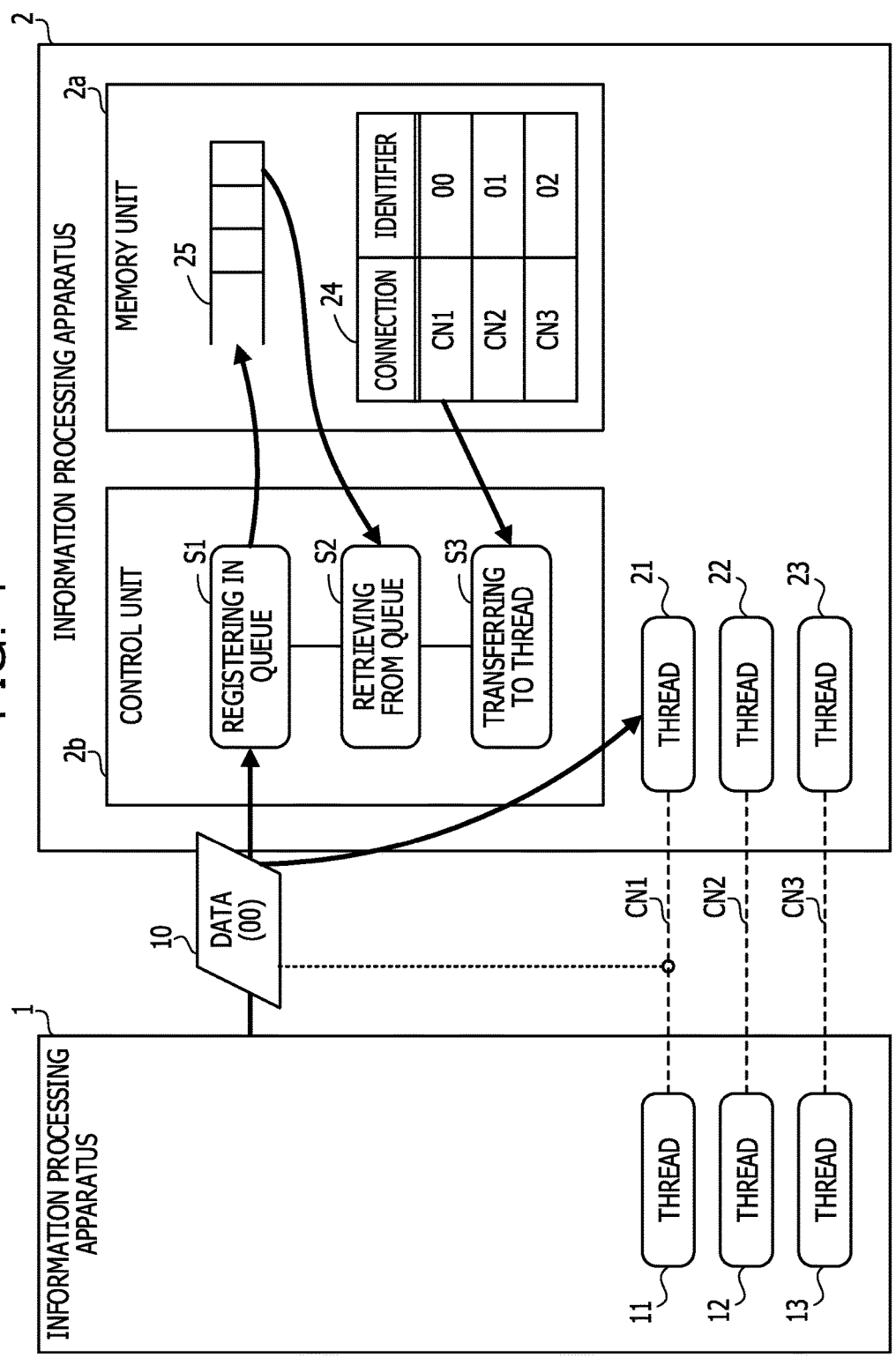
FIG. 1 is a diagram illustrating a configuration example and a processing example of an information processing system according to a first embodiment.

FIG. 1 is a diagram illustrating a configuration example and a processing example of an information processing system according to a first embodiment. The information processing system illustrated in FIG. 1 includes information processing apparatuses 1 and 2. The information processing apparatuses 1 and 2 are connected by, for example, using InfiniBand. The information processing apparatus 1 and 2 may communicate each other.

In the information processing apparatus 1, threads 11 to 13 are executed. On the other hand, in the information processing apparatus 2, threads 21 to 23 are executed. A connection CN1 is established between the thread 11 and the thread 21, and the thread 11 and the thread 21 communicates via the connection CN1. A connection CN2 is established between the thread 12 and the thread 22, and the thread 12 and the thread 22 communicate via the connection CN2. A connection CN3 is established between the thread 13 and the thread 23, and the thread 13 and the thread 23 communicate via the connection CN3.

Hereinafter, there is described a case where data is transmitted from the information processing apparatus 1 to the information processing apparatus 2.

The information processing apparatus 2 on receiving side includes a memory unit 2a and a control unit 2b. The memory unit 2a is implemented, for example, as a storage region of a memory device such as a random access memory (RAM) and a hard disk drive (HDD) provided on the information processing apparatus 2. The control unit 2b is implemented, for example, as a processor provided on the information processing apparatus 2.

The memory unit 2a stores correspondence information 24. The correspondence information 24 includes a unique identifier registered for each of combinations of threads in which a connection is established between a plurality of threads executed on the information processing apparatus 1 and a plurality of threads executed on the information processing apparatus 2. In the example of FIG. 1, an identifier "00" is registered for the connection CN1 between the thread 11 and the thread 21. An identifier "01" is registered for the connection CN2 between the thread 12 and the thread 22. Furthermore, an identifier "02" is registered for the connection CN3 between the thread 13 and the thread 23.

In the memory unit 2a, there is stored a queue 25 that stores information using a first in first out (FIFO) method. In the queue 25, there is stored a completion notification indicating reception completion in a case where any one of threads 21 to 23 of the information processing apparatus 2 requests the reception of data from the information processing apparatus 1 and the information processing apparatus 1 receives the requested data. In a case where the control unit 2b may obtain a completion notification corresponding to a certain reception request, the control unit 2b may recognize that the reception of data corresponding to the received request is completed.

Data is transmitted via any one of established connections CN1 to CN3 from the information processing apparatus 1 to the information processing apparatus 2. At this time, an identifier indicating a connection (that is, the combination of a transmission source thread and a destination thread) is added to the transmitted data.

For example, it is considered that the thread 11 requests data transmission on a communication interface (not illustrated) of the information processing apparatus 1 and then data 10 is transmitted via the connection CN1. At this time, an identifier "00" indicating the connection CN1 is added to the transmitted data 10. On the other hand, the thread 21 requests data reception on a communication interface (not illustrated) of the information processing apparatus 2 and enters a state of waiting for reception.

In a case where the data 10 is received from the information processing apparatus 1, the control unit 2b registers, in the queue 25, a completion notification indicating that the reception has been completed (step S1). Thereafter, the control unit 2b periodically retrieves completion notifications registered in the queue 25 (step S2).

In a case where a completion notification is retrieved from the queue 25, the control unit 2b specifies a received data corresponding to the retrieved completion notification and acquires an identifier added to the received data. Referring to the correspondence information 24, the control unit 2b specifies, from among threads 21 to 23, a thread belonging to the connection corresponding to the acquired identifier.

For example, it is considered that the data 10 is specified as the received data corresponding to the retrieved completion notification. In this case, the identifier "00" added to the data 10 is acquired, and the thread 21 belonging to the connection CN1 indicated by the identifier "00" is specified. Then, the control unit 2b transfers the received data 10 to the specified thread 21 (step S3). Therefore, the thread 21 is returned from a state of waiting for reception and may continue processing using the data 10.

In the information processing apparatus 2 as described above, the threads 21 to 23 share the queue 25 in which completion notifications are stored. In addition, an identifier for identifying the connection used for communication is added to the transmitted data from the information processing apparatus 1. Therefore, the control unit 2b acquires the identifier from the received data corresponding to the completion notification acquired from the queue 25, thereby making it possible to identify which of the threads 21 to 23 is the destination of the received data. By making it possible to identify a destination thread in this manner, it is possible that one queue 25 is shared by the threads 21 to 23.

By preparing only the one queue 25 without respectively preparing the queue 25 for each of the threads 21 to 23, the completion notification corresponding to received data via not one connection but also any of connections CN1 to CN3 is stored in the queue 25. Therefore, even though there is a difference in the number of communication connections among connections CN1 to CN3, there is a high possibility that the completion notification is stored in the queue 25.

Thus, in a case where the control unit 2b periodically retrieves the completion notification from the queue 25, there is a low possibility that the completion notification to be retrieved does not exist in the queue 25. As a result, it is possible to reduce a possibility that there is executed an unnecessary retrieve processing through which the completion notification is not retrieved so that the processing efficiency of the entire reception processing performed by the control unit 2b may be improved.

Second Embodiment

Figure 2:
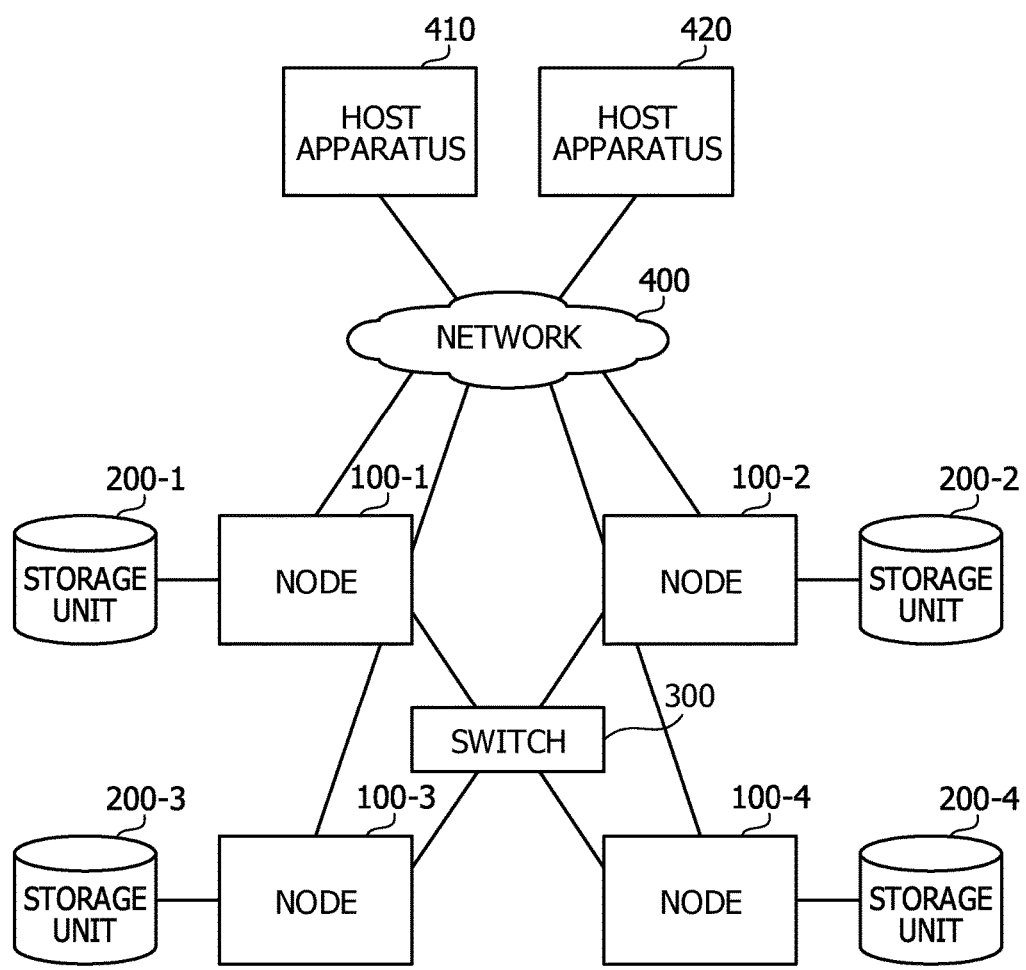
FIG. 2 is a diagram illustrating a configuration example of a storage system according to a second embodiment.

FIG. 2 is a diagram illustrating a configuration example of a storage system according to a second embodiment. The storage system illustrated in FIG. 2 includes nodes 100-1 to 100-4. Storage units 200-1, 200-2, 200-3, and 200-4 are connected to nodes 100-1, 100-2, 100-3, and 100-4, respectively. Nodes 100-1, 100-2, 100-3, and 100-4 operate as storage controllers for controlling access to the storage units 200-1, 200-2, 200-3 and 200-4, respectively.

One or a plurality of nonvolatile storage devices are mounted on each of the storage units 200-1 to 200-4. The nonvolatile storage device, for example, is a solid state drive (SSD) or a hard disk drive (HDD). The node 100-1 and the storage unit 200-1, the node 100-2 and the storage unit 200-2, the node 100-3 and the storage unit 200-3, and the node 100-4 and the storage unit 200-4, respectively form a storage node. The number of storage nodes included in the storage system is not limited to four nodes as illustrated in FIG. 2 and may be a certain number of two or more.

The nodes 100-1 to 100-4 are connected with one another via a switch 300. In this embodiment, the nodes 100-1 to 100-4 are connected with one another using InfiniBand. The nodes 100-1 to 100-4 are connected to host apparatuses 410 and 420 via a network 400. The nodes 100-1 to 100-4, and the host apparatuses 410 and 420 are connected through, for example, a Storage Area Network (SAN) using a Serial Attached SCSI (Small Computer System Interface) (SAS) or a fibre channel (FC).

This storage system operates, for example, as a distributed storage system in which data requested to be written from the host apparatuses 410 and 420 are distributed and stored. For example, storage access control is executed as follows.

The storage system provides a plurality of logical volumes to the host apparatuses 410 and 420. In a case where a certain logical volume is accessed, the host apparatuses 410 and 420 transmit an Input/Output (IO) request to any one of the nodes 100-1 to 100-4. For each range of a write address in the logical volume, a serving node for storing data is determined in advance.

For example, it is considered that a certain node receives a write request as an IO request. The node, which has received the write request, analyzes the write address, determines the serving node from among the nodes 100-1 to 100-4, and transmits write data to the serving node. After the serving node temporarily stores the transmitted write data in a cache, the serving node at an asynchronous timing stores the write data in a storage unit connected to the serving node.

For example, the serving node may be determined based on the hash value of the write data. In this case, the serving node also may perform "duplication elimination" to control so that data of the same content is not stored in the storage in duplication, based on the hash value of the write data.

The number of host apparatuses that may be connected to the storage system is not limited to two as illustrated in FIG. 2.

Figure 3:
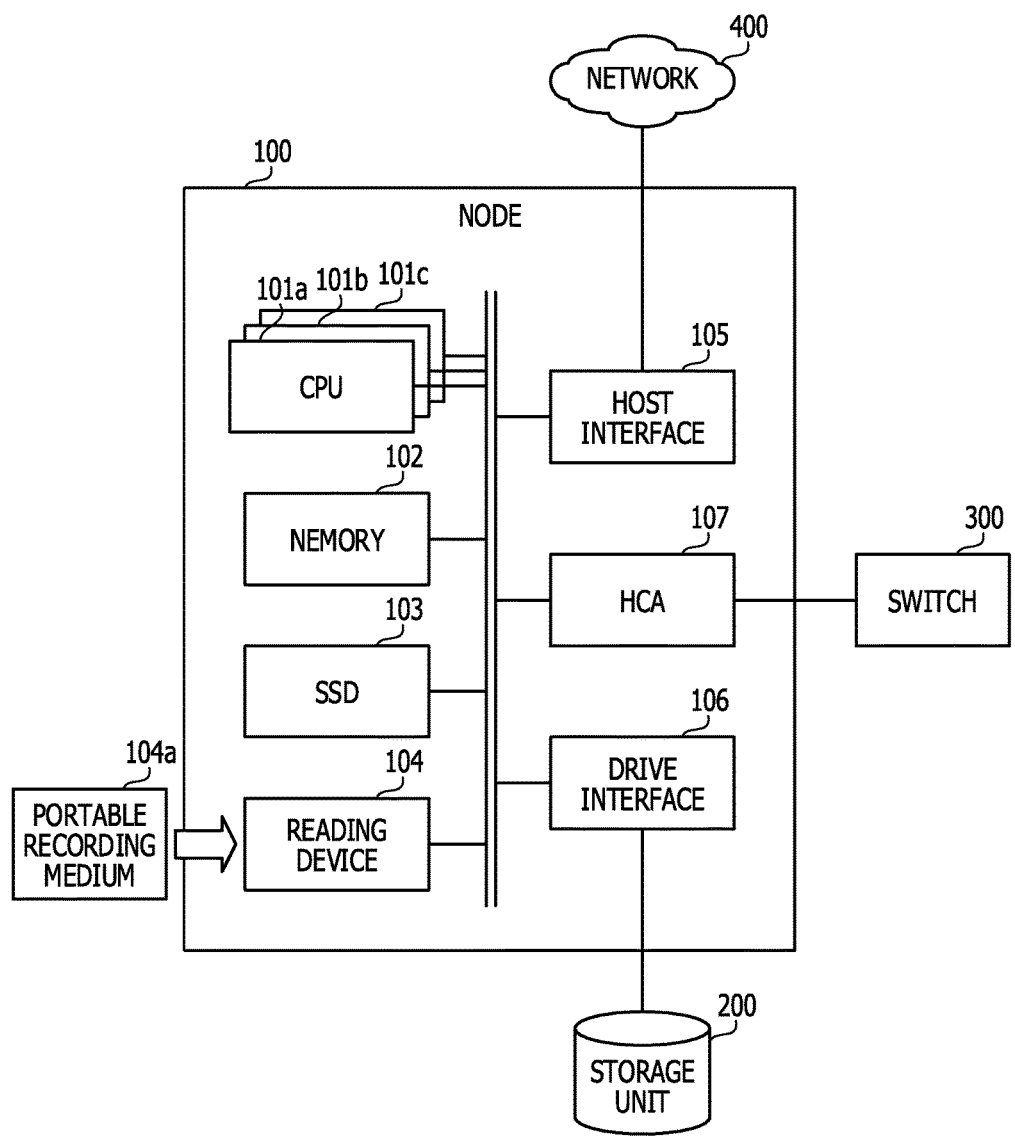
FIG. 3 is a diagram illustrating an example of a hardware configuration of a node.

FIG. 3 is a diagram illustrating an example of a hardware configuration of a node. The node 100 as illustrated in FIG. 3 indicates any one of the nodes 100-1 to 100-4 as illustrated in FIG. 2. In the following description, in the case where each of the nodes 100-1 to 100-4 is indicated without especially differentiating between the nodes, the nodes may be described as "node 100".

The node 100 is implemented, for example, as a computer as illustrated in FIG. 3. The node 100 has central processing units (CPUs) 101a to 101c, a memory 102, an SSD 103, a reading device 104, a host interface 105, a drive interface 106, and a host channel adapter (HCA) 107.

The CPUs 101a to 101c totally control the entire node 100. The number of CPUs is not limited to three. The memory 102 is a volatile storage device such as a dynamic random access memory (DRAM), and is used as a main storage device of the node 100. In the memory 102, there is temporarily stored at least a part of an operating system (OS) program and an application program to be executed by the CPUs 101a to 101c. In the memory 102, there are stored various data desirable for processing by the CPUs 101a to 101c.

The SSD 103 is used as an auxiliary storage device of the node 100. In the SSD 103, there are stored OS programs, application programs, and various data. As the auxiliary storage device, another type of nonvolatile storage device such as an HDD may be used. A portable recording medium 104a is attached and detached to the reading device 104. The reading device 104 reads data recorded on the portable recording medium 104a and transmits the data to the CPUs 101a to 101c. Examples of the portable recording medium 104a include an optical disk, a magneto-optical disk, a semiconductor memory, and the like.

The host interface 105 is an interface device for communicating with the host apparatuses 410 and 420 via the network 400. The drive interface 106 is an interface device for communicating with a storage unit 200. The HCA 107 is an interface device in compliance with InfiniBand, for communicating with another node 100 via the switch 300.

With the above hardware configuration, the processing function of the node 100 (the nodes 100-1 to 100-4) may be implemented. The host apparatuses 410 and 420 may also be implemented as a computer having a CPU, a memory and the like, similarly to the node 100.

Allocation of Queue to Threads

Next, allocation of a queue used for communication between nodes with respect to a thread executed on a node is described. Herein, firstly, with reference to FIGS. 4 and 5, a comparative example of inter-node communication using InfiniBand is described, and then inter-node communication according to this embodiment is described.

Figure 4:
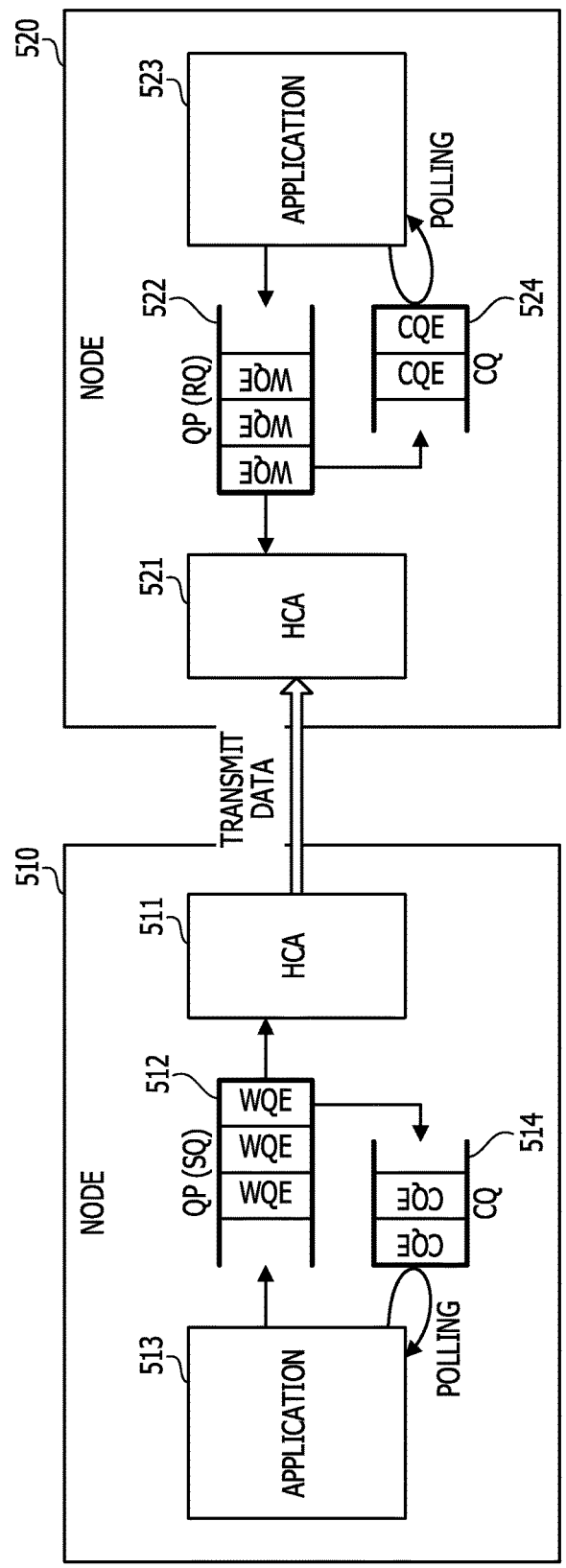
FIG. 4 is a diagram for explaining a basic communication processing procedure between a transmitting-side node and a receiving-side node.

FIG. 4 is a diagram for explaining a basic communication processing procedure between the transmitting-side node and the receiving-side node. FIG. 4 illustrates the node 510 having the HCA 511 and the node 520 having the HCA 521, and there is described a case where data is transmitted from the node 510 to the node 520 via InfiniBand.

In InfiniBand, communication is performed using a transmission QP 512 and a reception QP 522. The transmission QP 512 is a FIFO in which an entry indicating a transmission request is stored, and the transmission QP 512 is also called a "send queue (SQ)". The entry stored in the QP 512 includes, for example, the address of a transmit buffer, and the like in which a transmitted message is stored. The reception QP 522 is a FIFO in which an entry indicating a received request is stored, and the reception QP 522 is also called a "receive queue (RQ)". The entry stored in the QP 522 includes, for example, the address of a receive buffer, and the like in which a received message is stored.

At the transmitting-side node 510, an application 513 issues a send function "send" (for example, ibv_post_send ( )) in a case where a message is transmitted. Then, the entry indicating the transmission request is stored in the QP 512, and the transmitted message is set in a transmit buffer indicated by an address designated as an argument. The entry stored in the QP 512 is called a work queue element (WQE). The HCA 511 transmits the transmitted message based on the entry acquired from the QP 512.

InfiniBand uses the CQ in addition to the QP. The CQ is a FIFO in which an entry indicating completion is stored. The entry stored in the CQ is called a completion queue entry (CQE). The content of "Completion" indicated by this entry includes "Successful Completion" indicating that a processing corresponding to the QP entry has been completed successfully and "Completion Error" indicating that the processing is ended with an error.

In a case where message transmission processing by the HCA 511 is completed, an entry indicating completion is stored in the CQ 514. The application 513 performs polling for the CQ 514 after issuing the send function "send", thereby acquiring an entry indicating the completion of a processing corresponding to the transmission request from the CQ 514.

On the other hand, at the receiving-side node 520, an application 523 issues a receive function "recv" (for example, ibv_post_recv ( )) in a case where a message is received. Then, an entry indicating the received request is stored in the QP 522. The HCA 521 receives a message based on the entry acquired from the QP 522 and sets the received message in a receive buffer indicated by an address included in the entry. In a case where a message reception processing by the HCA 521 is completed, an entry indicating completion is stored in the CQ 524. The application 523 performs polling for the CQ 524 after issuing the receive function "recv", thereby acquiring an entry indicating the completion of a processing corresponding to the received request from the CQ 524. The application 523 acquires the received message from the receive buffer indicated by an address included in the acquired entry.

In this manner, in a case where communicating through InfiniBand, the applications request transmission or reception of a message and then polls for the CQ to detect that the requested processing is completed.

Figure 5:
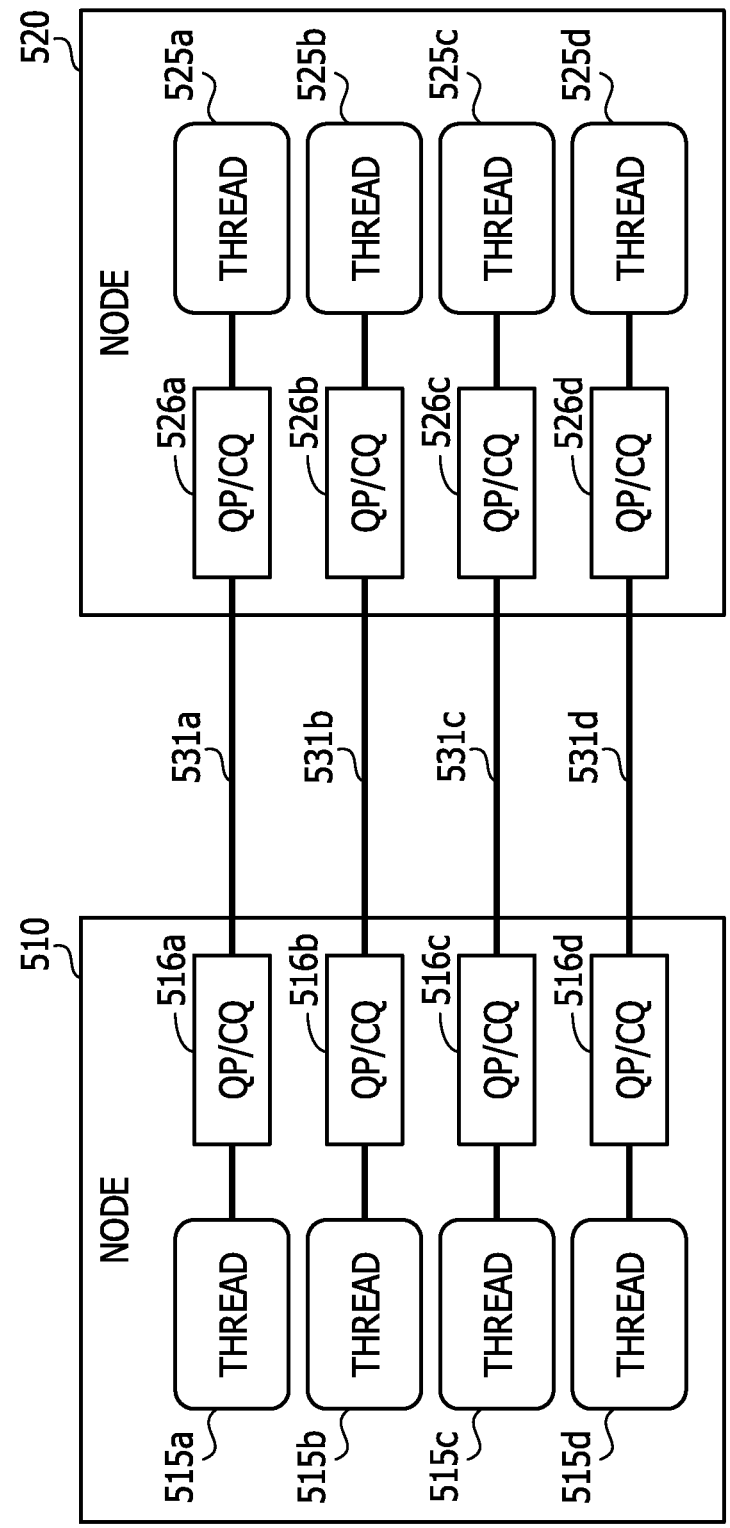
FIG. 5 is a diagram illustrating a comparative example of communication processing between a plurality of threads.

FIG. 5 is a diagram illustrating a comparative example of communication processing between a plurality of threads. Hereinafter, it is considered that a "QP/CQ" includes a transmission QP and a CQ corresponding thereto, and a reception QP and a CQ corresponding thereto. However, the CQ may be shared by the transmission QP and the reception QP.

Herein, it is considered that communication is performed between one specific thread executed on a certain node and one specific thread executed on a node other than the certain node. In this case, there is provided a method of establishing a connection which is a logical communication path between one thread of one node and one thread of the other node, and allocating individual QP/CQs for respective connections, which is the simplest method. The reason is that, according to this method, each thread may easily acquire an entry addressed to the thread itself only by polling the allocated CQ after performing transmission or received requests.

For example, in FIG. 5, threads 515a to 515d are executed on the node 510 and threads 525a to 525d are executed on node 520. Communication is performed between the thread 515a and the thread 525a, between the thread 515b and the thread 525b, between the thread 515c and the thread 525c, and between the thread 515d and the thread 525d, respectively.

In this case, for the connection 531a between the thread 515a and the thread 525a, the QP/CQ 516a is allocated to the thread 515a and the QP/CQ 526a is allocated to the thread 525a. Similarly, for the connection 531b between the thread 515b and the thread 525b, the QP/CQ 516b is allocated to the thread 515b and the QP/CQ 526b is allocated to the thread 525b. For the connection 531c between the thread 515c and the thread 525c, the QP/CQ 516c is allocated to the thread 515c and QP/CQ 526c is allocated to the thread 525c. Furthermore, for the connection 531d between the thread 515d and the thread 525d, the QP/CQ 516d is allocated to the thread 515d and the QP/CQ 526d is allocated to the thread 525d.

With such a configuration, for example, only the entry addressed to the thread 525a is stored in the CQ of the QP/CQ 526a. Therefore, after requesting the reception of a message, the thread 525a may easily acquire the entry of completion corresponding to a reception request only by monitoring the CQ of the QP/CQ 526a.

However, in such a configuration, there are the following problems in a case where the number of connections established between threads increases.

Connections 531a to 531d established between threads exist on a common physical communication path. Therefore, as the number of established connections increases, there is a possibility that a delay time after a thread requests transmission or reception and until the entry of completion corresponding to the request may be acquired from the CQ becomes longer.

In a case where there is a difference in the number of communication connections among connections 531a to 531d, with respect to a CQ corresponding to a thread with high communication frequency, the number of entries stored in the CQ per unit time increases, even if the above delay time becomes longer. Therefore, as there is a thread of a connection with high communication frequency, there is a high probability that the thread of the connection with the high communication frequency may acquire the entry of completion in a case where the thread polls for the CQ. However, on the other hand, as there is a thread of a connection with low communication frequency, there is a low probability that the thread of the connection with low communication frequency may acquire the entry of completion in a case where the thread polls for the CQ. As described above, there is a problem that a thread of the connection with low communication frequency performs a lot of unnecessary polling so that resources such as a CPU and a memory are wasted.

Figure 6:
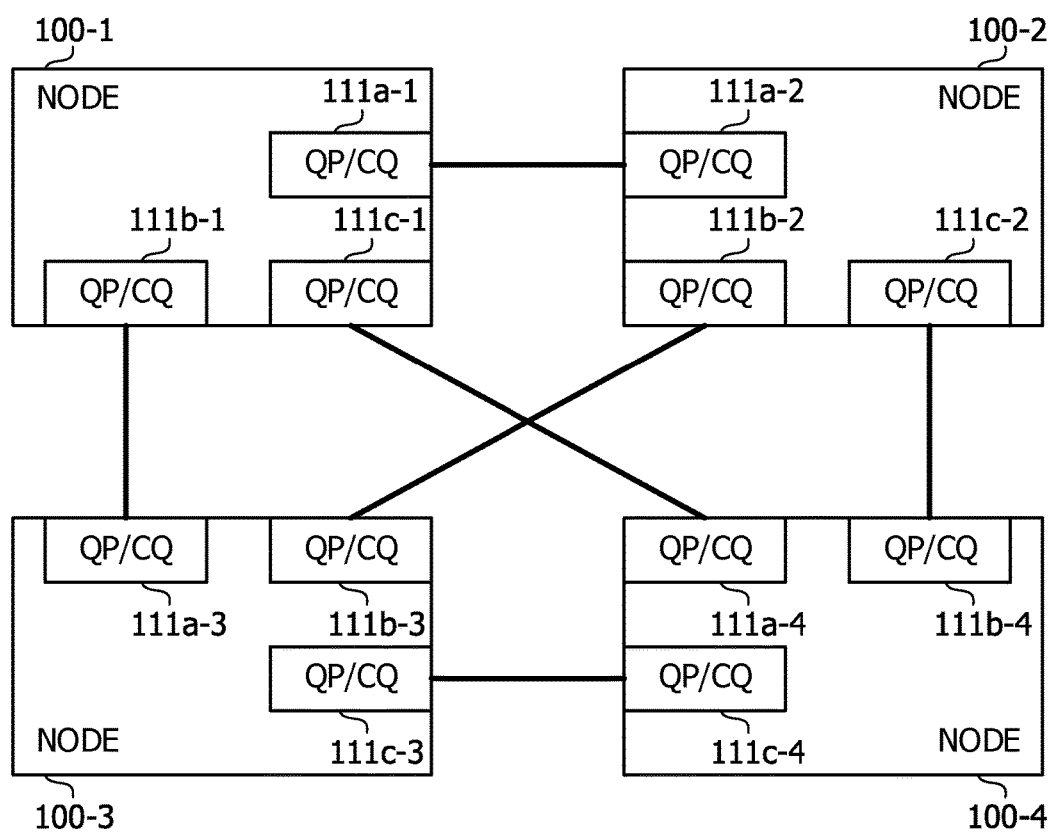
FIG. 6 is a diagram illustrating the disposition of QP/CQ in this embodiment.

In relation to the problem, in this embodiment, QP/CQs are arranged as illustrated in FIG. 6 below.

FIG. 6 is a diagram illustrating the disposition of QP/CQs in this embodiment. In this embodiment, one node has only one QP/CQ for each node of communication partners. Specifically, as illustrated in FIG. 6, the node 100-1 has QP/CQs 111a-1, 111b-1, and 111c-1 for communicating with the nodes 100-2, 100-3, and 100-4, respectively. The node 100-2 has QP/CQs 111a-2, 111b-2, 111c-2 for communicating with the nodes 100-1, 100-3 and 100-4, respectively. The node 100-3 has QP/CQs 111a-3, 111b-3, 111c-3 for communicating with the nodes 100-1, 100-2 and 100-4, respectively. The node 100-4 has QP/CQs 111a-4, 111b-4, and 111c-4 for communicating with the nodes 100-1, 100-2 and 100-3, respectively.

Figure 7:
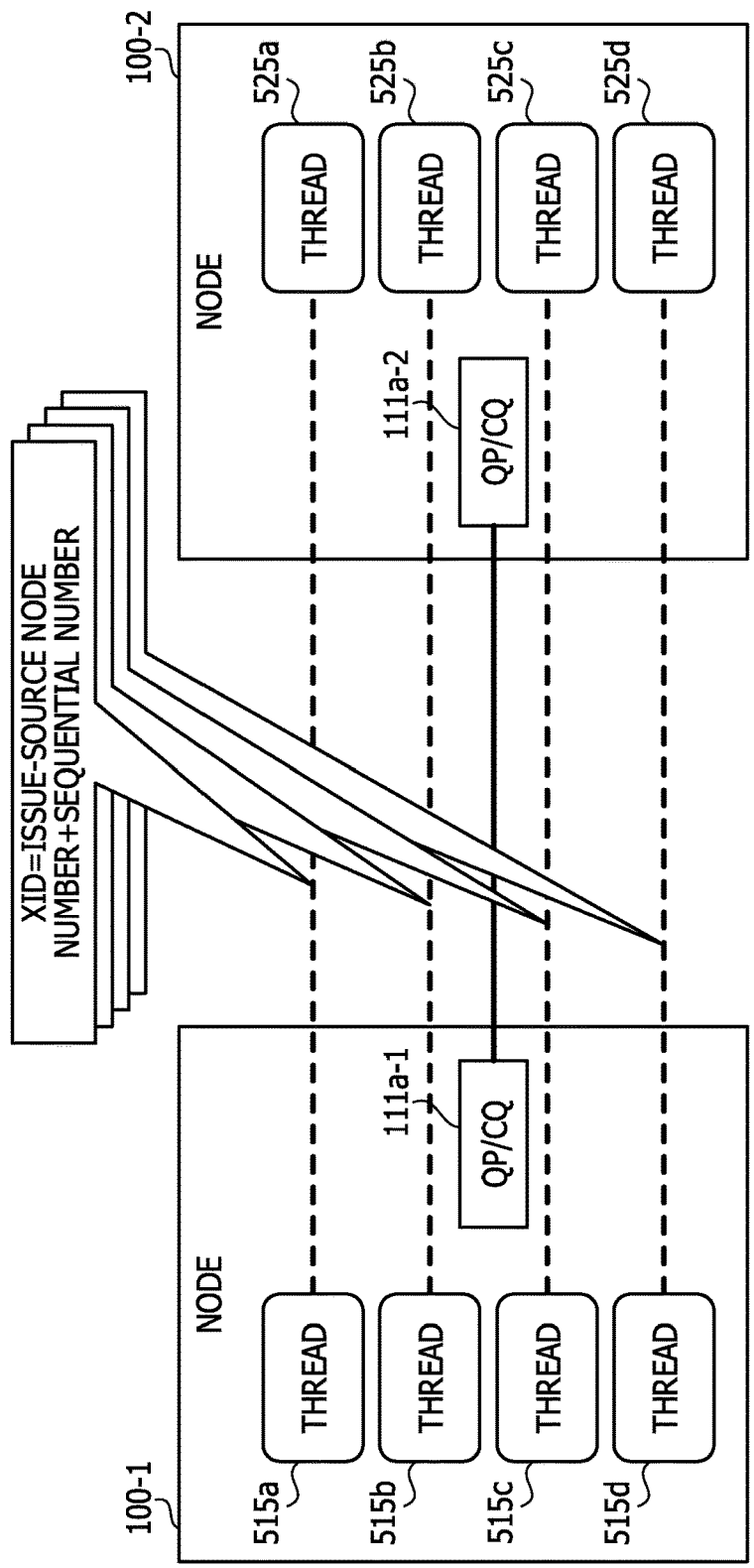
FIG. 7 is a diagram for explaining communication between a plurality of threads.

In this manner, in this embodiment, only one QP/CQ within one node is limited to be used for communication with another node. As illustrated in FIG. 7 below, on one node, a plurality of threads communicating with another node share one QP/CQ.

FIG. 7 is a diagram for explaining communication between a plurality of threads. In FIG. 7, as an example, there is described communication between the node 100-1 and the node 100-2. It is considered that the threads 515a to 515d are executed on the node 100-1 and the threads 525a to 525d are executed on the node 100-2. Communication is performed between the thread 515a and the thread 525a, between the thread 515b and the thread 525b, between the thread 515c and the thread 525c, and between the thread 515d and the thread 525d, respectively.

The node 100-1 has a QP/CQ 111a-1 for communicating with the node 100-2. The QP/CQ 111a-1 is shared by the threads 515a to 515d in a case where communication with the node 100-2 is performed. On the other hand, the node 100-2 has a QP/CQ 111a-2 for communicating with the node 100-1. The threads 525a to 525d share the QP/CQ 111a-2 in a case where communication with the node 100-1 is performed.

However, for this configuration, for example in a case where a reception request is issued from each of the threads 525a to 525d, entries of completion having destinations as the threads 525a to 525d, respectively, coexist in the CQ of the QP/CQ 111a-2. At this time, the threads 525a to 525d may not determine to which thread an entry stored in the CQ of the QP/CQ 111a-2 is addressed.

Therefore, in this embodiment, an "XID" which is a unique identification number in the entire system is assigned to each connection established between threads. In a case where a message is transmitted from a certain thread to a thread of another node, an XID corresponding to a connection between these threads is added to the transmitted message. Therefore, in a case where a thread of a receiving-side node acquires a received message based on an entry acquired from the CQ, the thread may determine, from the XID included in the received message, whether or not the entry is addressed to the thread itself.

The XID is generated by combining a node number indicating a node that issued the XID and a number changed sequentially each time the XID is issued. Since the XID includes an issue-source node number, it is possible not to generate the same XID on any other node. As described below, the XID is generated in a case where a connection between threads is established. The issue-source node refers to a node that suggested the establishment of the connection.

Furthermore, in this embodiment, in a case where a certain thread acquires an entry from the CQ by polling and the entry is addressed to another thread itself, it is possible for another thread to recognize the fact that the entry is addressed to another thread itself. For example, in a case where the thread 525a polls for the CQ of the QP/CQ 111a-2 and acquires an entry indicating reception completion, and the entry is addressed to the thread 525b itself, the thread 525a transfers a received message corresponding to the entry to the thread 525b. The thread 525b may continue processing using the received message.

As described above, in this embodiment, only one CQ within one node is limited to be used for communication with another node. In a case where a thread of a node acquires an entry from the CQ by polling and determines, from an XID, to which thread the entry is addressed, the thread causes a destination thread to recognize the completion of communication processing corresponding to the entry related to the destination thread.

Therefore, even though there is a difference in the number of communication connections among threads, there is a low probability that each thread may not acquire an entry addressed to the thread itself in a case where each thread performs polling for the CQ. As a result, it is possible to reduce the number of unnecessary polling so that the utilization efficiency of resources such as a CPU and a memory is improved. By improving the utilization efficiency of resources on the node, it is possible to increase a response speed in response to the IO request from the host apparatus.

For example, the QP/CQ is generated in the memory region of each node at an initial stage in which the operation of the storage system is started. For example, each node acquires device information of the HCA 107 by designating the address of the HCA 107 of another node, and generates the QP/CQ corresponding to another node based on the device information. It is possible to communicate between connected nodes by recognizing the completion of generating the QP/CQ between the nodes.

Processing Function of Node

Figure 8:
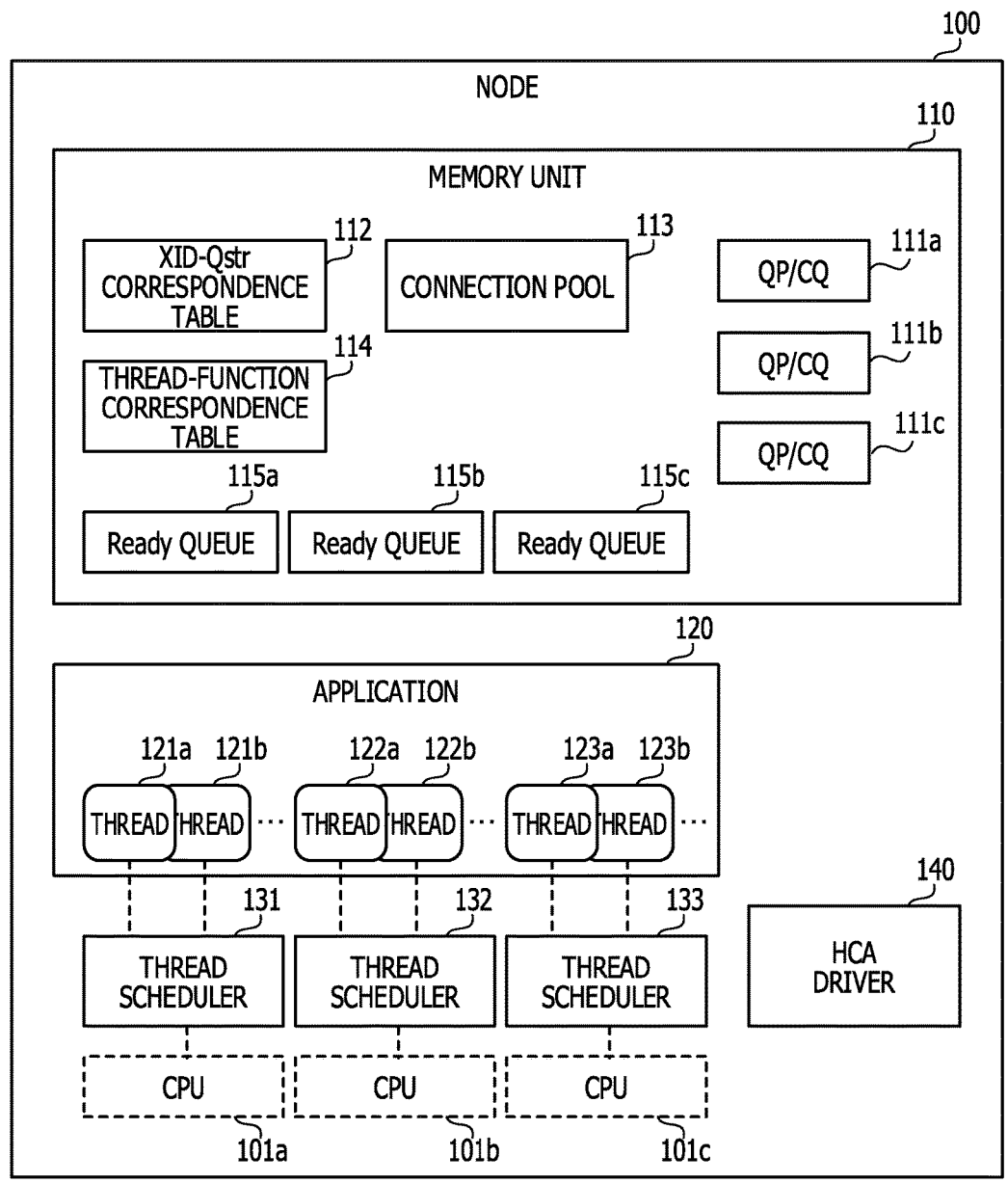
FIG. 8 is a block diagram illustrating a configuration example of processing functions that a node includes.

FIG. 8 is a block diagram illustrating a configuration example of processing functions that a node includes. The node 100 has a memory unit 110, an application 120, thread schedulers 131 to 133, and an HCA driver 140.

The memory unit 110 is implemented, for example, as a storage region of the memory 102. The QP/CQs 111a to 111c, an XID-Qstr correspondence table 112, a connection pool 113, a thread-function correspondence table 114, and Ready queues 115a to 115c are stored in the memory unit 110.

The QP/CQs 111a to 111c are QP/CQs used for communication with other nodes. As described above, the QP/CQs 111a to 111c are associated with individual nodes, respectively.

The XID-Qstr correspondence table 112 holds the correspondence relationship between an XID and a queuing structure (Q-Structure). In the XID-Qstr correspondence table 112, each time a connection between nodes is established and a new XID is issued, a record including the XID and information indicating the queuing structure is additionally registered. As described below, the queuing structure is a data structure for managing threads in a suspended state, and one queuing structure is generated for one XID.

The connection pool 113 holds an unused connection structure. As described below, the connection structure is a data structure used for communication through a connection between threads, and one connection structure is used for one XID.

The thread-function correspondence table 114 holds the correspondence relationship between the type of the processing content of the thread and the function executed by the type of the thread.

Ready queues 115a to 115c are a queue in which entries corresponding to threads to be executed are stored. Ready queues 115a, 115b, and 115c are referred to by thread schedulers 131, 132, and 133, respectively.

The processing of the application 120 is implemented, for example, by executing a predetermined application program using the CPUs 101a to 101c. The application 120, for example, executes control processing of access to the storage. The processing of the application 120 includes a plurality of threads.

The processing of the thread schedulers 131 to 133 and the HCA driver 140 is implemented, for example, by executing the OS program by the CPUs 101a to 101c.

Based on the ready queue 115a, the thread scheduler 131 controls the execution order of threads 121a, 121b, and, . . . , executed by the CPU 101a among threads of the application 120. Based on the ready queue 115b, the thread scheduler 132 controls the execution order of threads 122a, 122b, and, . . . , executed by the CPU 101b among threads of the application 120. Based on the ready queue 115c, the thread scheduler 133 controls the execution order of threads 123a, 123b, and, . . . , executed by the CPU 101c among threads of the application 120.

The HCA driver 140 controls the operation of the HCA 107. The HCA driver 140 provides the application 120 with an application programming interface (API) for using the HCA 107.

Polling for the CQ and Thread Scheduling

Next, there is described polling for the CQ and thread scheduling. Firstly, with reference to FIGS. 9 and 10, a comparative example of thread scheduling is described, and then with reference to FIG. 11, thread scheduling according to this embodiment is described.

Figure 9:
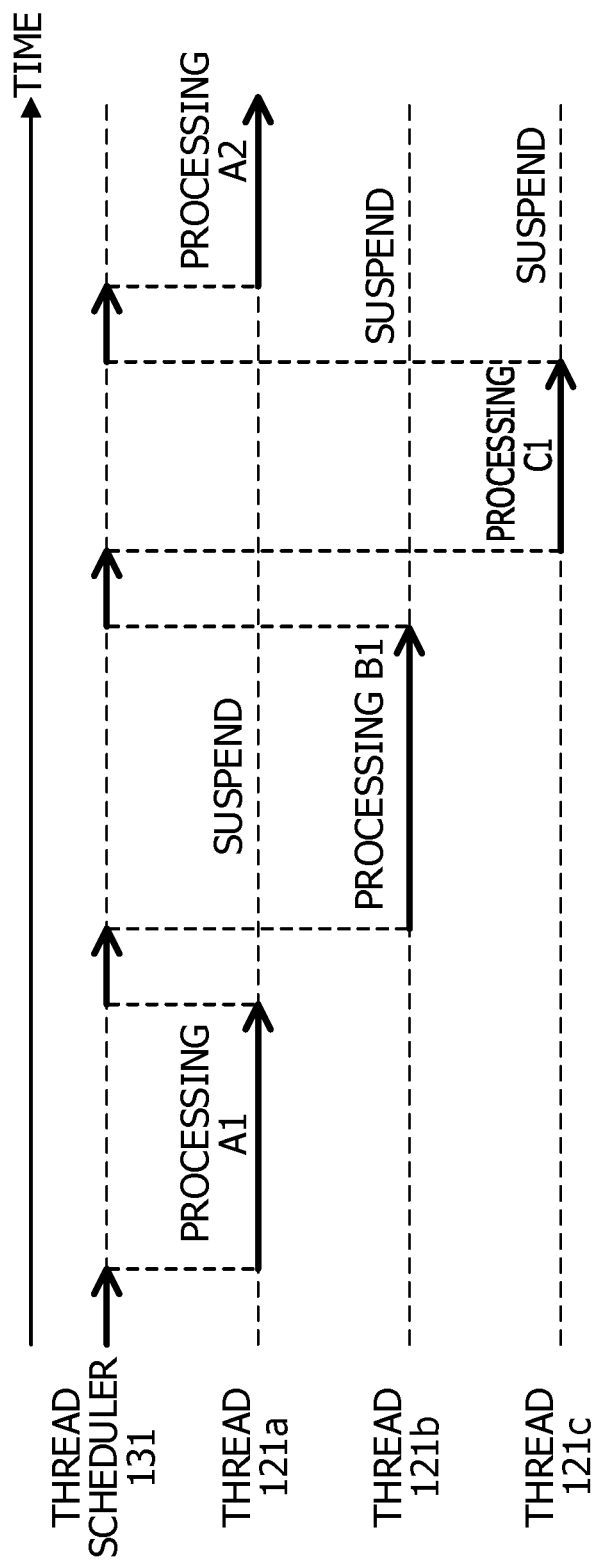
FIG. 9 is a diagram illustrating a first comparative example of thread scheduling.

FIG. 9 is a diagram illustrating a first comparative example of thread scheduling. FIG. 9 illustrates scheduling of threads by the thread scheduler 131 as an example. The thread scheduler 131 sequentially acquires entries from the ready queue 115a and starts execution of threads corresponding to the acquired entries. In a case where a thread executes processing with the limit of a certain length, the thread is suspended and transfers control to the thread scheduler 131.

For example, as illustrated in FIG. 9, the thread scheduler 131 starts execution of the thread 121a. After executing the processing A1, the thread 121a is suspended and transfers control to the thread scheduler 131. Next, the thread scheduler 131 starts execution of the thread 121b. After executing the processing B1, the thread 121b is suspended and transfers control to the thread scheduler 131. Next, the thread scheduler 131 starts execution of the thread 121c. After executing the processing C1, the thread 121c is suspended and transfers control to the thread scheduler 131. Next, the thread scheduler 131 starts execution of the thread 121a. The thread 121a executes processing A2 following to the processing A1.

Figure 10:
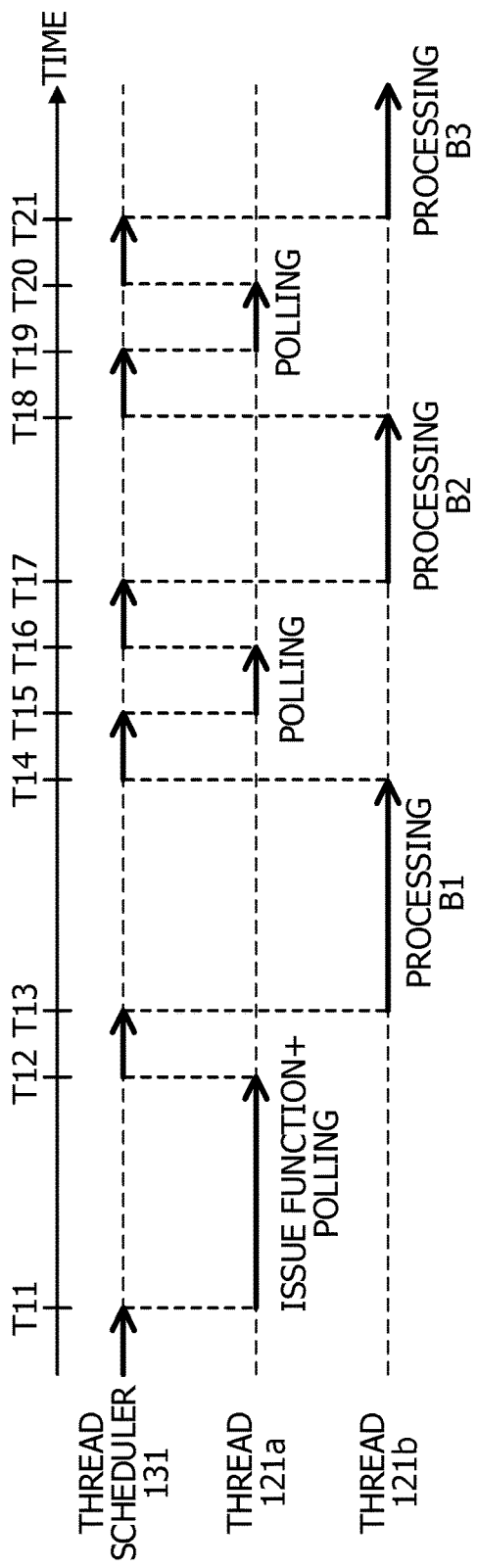
FIG. 10 is a diagram illustrating a second comparative example of thread scheduling.

FIG. 10 is a diagram illustrating a second comparative example of thread scheduling. FIG. 10 illustrates an example of a case that threads 121a and 121b are executed and the thread 121a performs the reception processing of a message.

Firstly, the thread scheduler 131 starts execution of the thread 121a (a timing T11). The thread 121a issues the receive function "recv" to the HCA driver 140. Therefore, an entry corresponding to a received message is registered in the QP. The thread 121a enters a state of waiting to receive a message and issues a function (ibv_poll_cq) for polling for the CQ each time a certain time elapses until an entry corresponding to the reception request may be acquired from the CQ. However, in a case where a corresponding entry may not be acquired even though the function is issued a predetermined number of times, the thread 121a temporarily is suspended and transfers control to the thread scheduler 131 (a timing T12).

The thread scheduler 131 starts execution of the thread 121b (a timing T13). After executing the processing B1, the thread 121b is suspended and transfers control to the thread scheduler 131 (a timing T14). The thread scheduler 131 wakes up the thread 121a (a timing T15). The wake-up thread 121a repeats issuing of a polling function again. However, in a case where a corresponding entry may not be acquired even though the function is issued a predetermined number of times, the thread 121a is suspended and transfers control to the thread scheduler 131 (a timing T16).

The thread scheduler 131 starts execution of the thread 121b (a timing T17). After executing processing B2 following to the processing B1, the thread 121b is suspended and transfers control to the thread scheduler 131 (a timing T18). The thread scheduler 131 wakes up the thread 121a (a timing T19). The wake-up thread 121a repeats issuing of a polling function again. However, in a case where the corresponding entry may not be acquired even though the function is issued a predetermined number of times, the thread 121a is suspended and transfers control to the thread scheduler 131 (a timing T20). The thread scheduler 131 starts execution of the thread 121b (a timing T21), and the thread 121b executes processing B3 following to the processing B2.

As in the above example, in a case where a received message does not arrive for a long time after the receive function "recv" is issued, the thread 121a repeatedly performs the operation of waking up, polling, and suspending. Each time the thread 121a is wake-up or suspended, context switching occurs. Context switching involves processing such as saving data in registers so that a processing load on the CPU is large. Therefore, in a case where the waking-up or suspending of the thread 121a is repeated as described above, there are problems that the processing load of the CPU increases, the processing of the other executable thread 121b is delayed, and processing efficiency decreases.

In relation to the problems, in this embodiment, not only a thread but also a thread scheduler may perform polling for the CQ. After issuing the receive function "recv", the thread performs polling for the CQ only once, and is suspended in a case where a message addressed to the thread itself does not arrive. Hereinafter, the polling for obtaining an entry corresponding to this thread is executed by a thread scheduler (or another thread).

Figure 11:
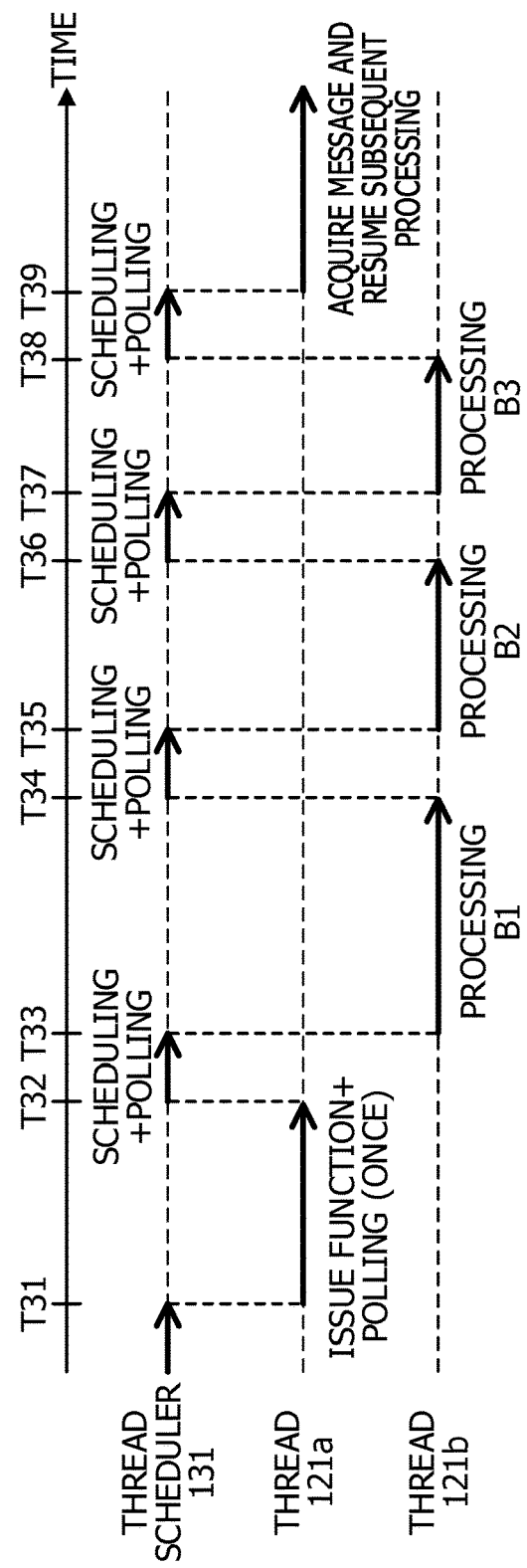
FIG. 11 is a diagram illustrating an example of thread scheduling according to this embodiment.

FIG. 11 is a diagram illustrating an example of thread scheduling according to this embodiment. FIG. 11 illustrates an example of a case that threads 121a and 121b are executed and the thread 121a performs reception processing of a message, similarly to a comparative example of FIG. 10.

Firstly, the thread scheduler 131 starts execution of the thread 121a (a timing T31). The thread 121a issues the receive function "recv" to the HCA driver 140, and then performs polling for the CQ only once. At this time, if the corresponding entry may not be acquired, the thread 121a immediately is suspended and transfers control to the thread scheduler 131 (a timing T32).

On the other hand, each time control is transferred, the thread scheduler 131 polls for the CQ as well as schedules a thread to be executed next. In the example of FIG. 11, in a case where control is transferred from the thread 121a at the timing T32, the thread scheduler 131 selects the thread 121b as a thread to be executed next and polls for the CQ. In a case where this is completed, the thread scheduler 131 starts execution of the thread 121b (a timing T33).

In a case where the execution of the processing B1 by the thread 121b is completed, control is transferred to the thread scheduler 131 (a timing T34), the thread scheduler 131 performs scheduling and polling. If an entry corresponding to the thread 121a may not be acquired from the CQ, the thread 121b is wake-up and executes a subsequent processing B2 (a timing T35).

In a case where the execution of the processing B2 is completed, control is transferred to the thread scheduler 131 (a timing T36), the thread scheduler 131 performs scheduling and polling. Here, also If an entry corresponding to the thread 121a may not be acquired from the CQ, the thread 121b is wake-up and executes a subsequent processing B3 (a timing T37).

In a case where the execution of the processing B3 is completed, control is transferred to the thread scheduler 131 (a timing T38), the thread scheduler 131 performs scheduling and polling. Here, in a case where an entry corresponding to the thread 121a may be acquired from the CQ, the thread scheduler 131 wakes up the thread 121a (a timing T39). The thread 121a acquires the received message and resumes subsequent processing.

As described above, the thread 121a performs polling for the CQ only once after issuing the receive function "recv", and is suspended if a corresponding entry may not be acquired. Hereinafter, the polling for acquiring an entry corresponding to this thread is performed by the thread scheduler 131. In a case where the thread scheduler 131 acquires an entry corresponding to the thread 121a from the CQ, the thread 121a is wake-up.

Through such a processing, the thread 121a that has failed in polling is not wake-up and suspended repeatedly. Therefore, the number of occurrences of unnecessary context switching is reduced, and the processing load on the CPU decreases. As a result, the processing efficiency of the CPU is improved, and the execution delay of an executable thread 121b may be reduced.

Figure 12:
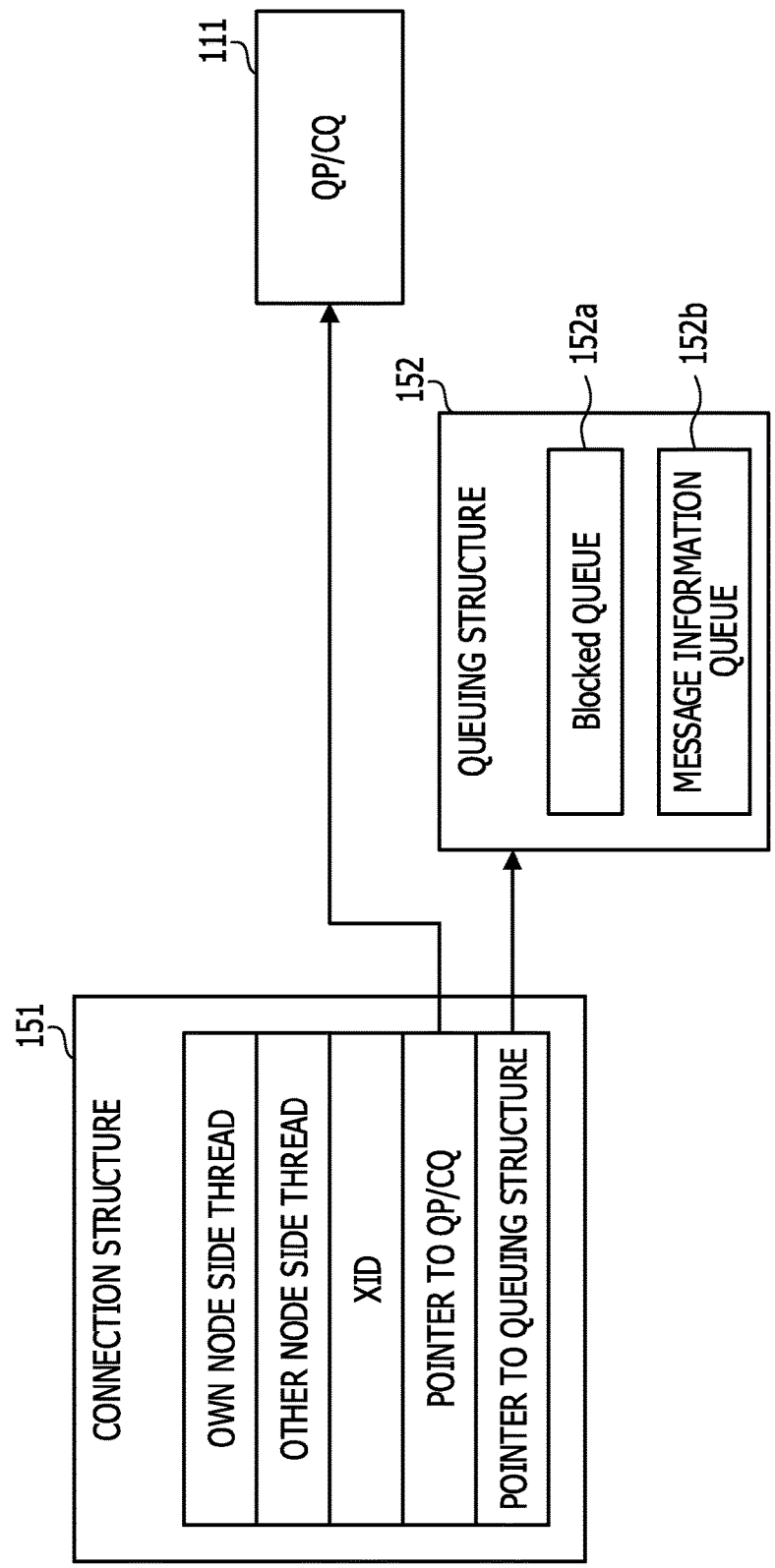
FIG. 12 is a diagram illustrating an example of a data structure used in the thread scheduling.

FIG. 12 is a diagram illustrating an example of a data structure used in thread scheduling. In this embodiment, as described above, a connection structure 151 and a queuing structure 152 are used for implementing thread scheduling.

Each time a connection between threads is established, the connection structure 151 is generated by threads on both sides of the connection, respectively, and is used for communication between one thread and the other thread. The connection structure 151 holds respective identification numbers of an own node side thread and another node side thread, an XID, a pointer to QP/CQ, and a pointer to the queuing structure.

The own node side thread indicates a thread of its own node of the nodes on both sides of the connection and the other node side thread indicates a thread of the other node thereof. As described above, the XID is a unique number generated for each connection between threads. The pointer to the QP/CQ indicates the positions of the QP and the CQ within the QP/CQ 111 used for communication with the thread of a communication partner. A pointer to the queuing structure indicates the position of a corresponding queuing structure 152.

The queuing structure 152 is a data structure used for managing the state of the thread on its own node side. The queuing structure 152 holds a blocked queue 152a and a message information queue 152b. An entry corresponding to a thread in a suspended state is retrieved from Ready queues 115a to 115c and stored in the blocked queue 152a. An entry including a pointer indicating a buffer region for storing a received message is stored in the message information queue 152b.

Figure 13:
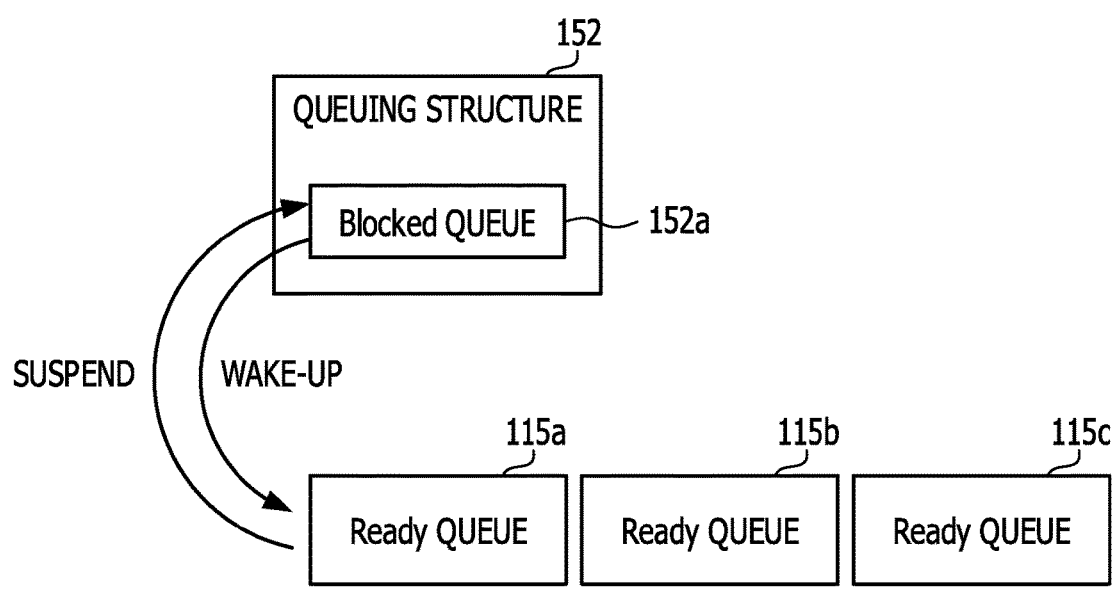
FIG. 13 is a diagram for explaining suspend and wake-up operations due to an entry movement between queues.

FIG. 13 is a diagram for explaining suspend and wake-up operations due to an entry movement between queues. In a case where a thread that issued the receive function "recv" fails in polling, the thread retrieves a corresponding entry from any one of the ready queues 115a to 115c and stores the corresponding entry in the blocked queue 152a of the queuing structure 152, thereby transitioning to the suspended state. At this time, the thread registers an entry including a pointer indicating a buffer region for storing the received message in the message information queue 152b of the queuing structure 152. This buffer region is a memory region for saving the received message stored in the receive buffer using the HCA driver 140.

Thereafter, the received message stored in the receive buffer is set in the buffer region by the thread scheduler or another thread, and a corresponding entry is retrieved from the blocked queue 152a and registered in any one of the ready queues 115a to 115c. Therefore, a thread corresponding to this entry is wake-up.

A state in which the thread is wake-up means a state in which the corresponding entry is registered in any one of the ready queues 115a to 115c, and in a case where the thread scheduler selects a thread to be executed next, targets to be selected includes this thread. An entry is retrieved from any one of the ready queues 115a to 115c to the thread scheduler, thereby starting execution of a thread corresponding to the entry.

Hereinafter, a specific example of state transition of a thread is described with reference to FIGS. 14 and 15. As an example, FIGS. 14 and 15 illustrates a case that thread #0 and thread #1 are executed on node 100-1.

Figure 14:
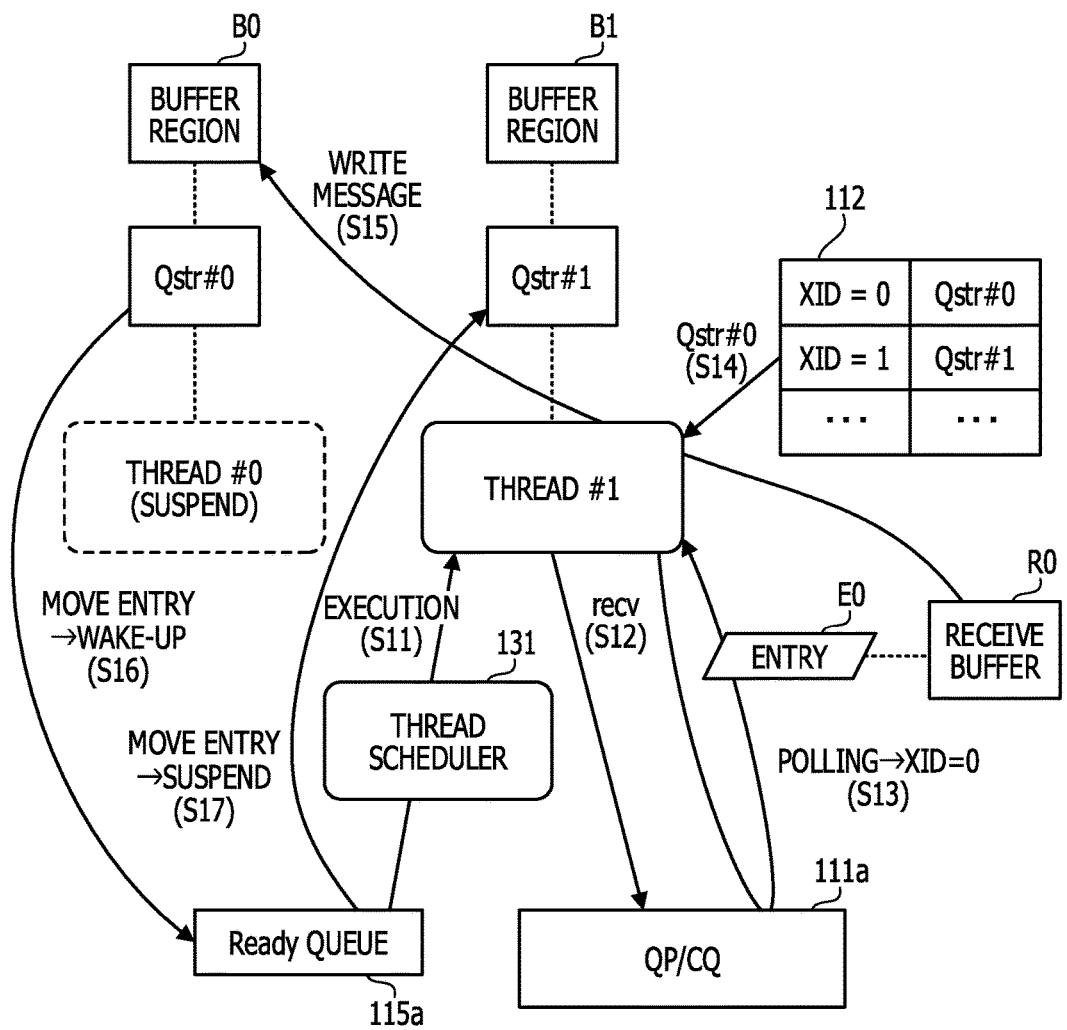
FIG. 14 is a diagram illustrating a first example of state transition of a thread.
Figure 15:
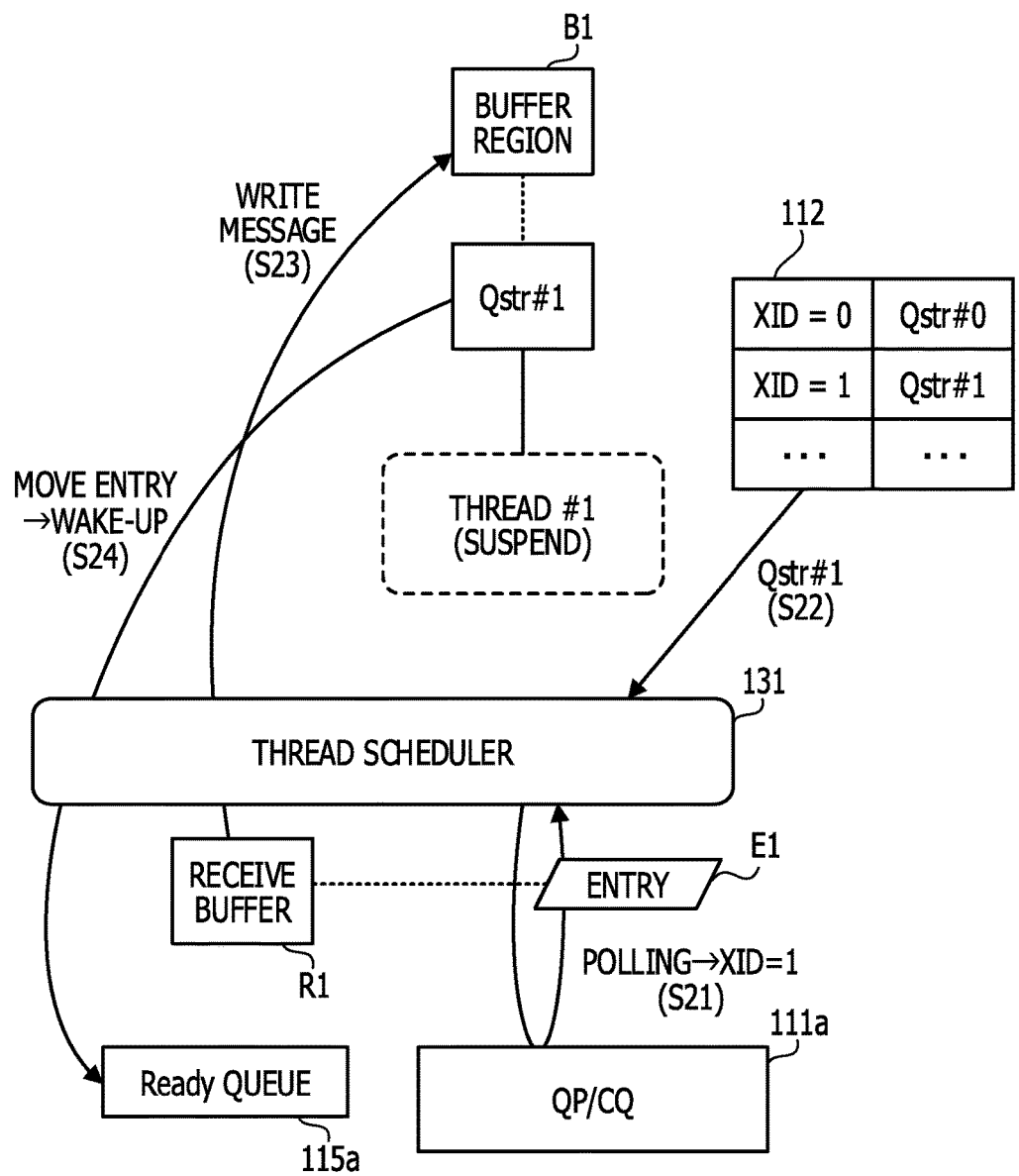
FIG. 15 is a diagram illustrating a second example of state transition of a thread.

FIG. 14 is a diagram illustrating a first example of state transition of a thread. In the initial state of FIG. 14, a connection between a thread #0 and a thread of another node (herein, it is considered to be a thread #01 of a node 100-2) is established. An XID "0" is assigned to this connection, and a queuing structure Qstr #0 is associated with the XID "0" in the XID-Qstr correspondence table 112. A connection between the thread #1 and another thread (it is considered to be a thread #11) of the node 100-2 is established. An XID "1" is assigned to this connection, and a queuing structure Qstr #1 is associated with the XID "1" in the XID-Qstr correspondence table 112.

Furthermore, the thread #0 enters the suspended state after requesting the reception of a message, and an entry corresponding to the thread #0 is stored in the blocked queue 152a of the queuing structure Qstr #0. An entry including a pointer indicating a buffer region B0 for storing a received message is registered in the message information queue 152b of the queuing structure Qstr #0.

In InfiniBand, it is guaranteed that a transmitting order of the message and a receiving order of the message are not exchanged.

From the above state, it is considered that the thread scheduler 131 acquires an entry corresponding to the thread #1 from the ready queue 115a and starts execution of the thread #1 (step S11). The thread #1 issues the receive function "recv" to the HCA driver 140 and requests reception of the message (step S12). Therefore, an entry corresponding to the reception request from the thread #1 is stored in the QP of the QP/CQ 111a. Furthermore, the thread #1 performs polling for the CQ of the QP/CQ 111a (step S13).

The thread #1 acquires an entry E0 from the CQ and acquires the received message from the receive buffer R0 indicated by the entry EU. Here, if the acquired received message includes the XID "1", the thread #1 recognizes that the entry is addressed to the thread #1 itself and may execute subsequent processing using the received message.

However, in the example of FIG. 14, it is considered that the acquired received message includes the XID "0". In this case, a message requested by the thread #0 has been received by the HCA 107, and the received message is stored in the receive buffer R0. The thread #1 recognizes that the acquired entry is not addressed to the thread #1 itself, refers to the XID-Qstr correspondence table 112, and specifies the queuing structure Qstr #0 corresponding to the XID "0" (step S14).

The thread #1 acquires an entry from the message information queue 152b of the queuing structure Qstr #0 and writes the received message stored in the receive buffer R0, into a buffer region B0 indicated by the acquired entry (step S15). Furthermore, the thread #1 retrieves an entry from the blocked queue 152a of the queuing structure Qstr #0 and moves the entry to the ready queue 115a (step S16). Therefore, the thread #0 is wake-up. That is, in a case where the moved entry is acquired by the thread scheduler 131 and execution of the thread #0 is started, the thread #0 may continue processing using the received message written in the buffer region B0.

The buffer region B0 is used for saving the received message stored in the receive buffer R0. By completing the polling in step S13, the receive buffer R0 indicated by the acquired entry E0 is released. However, as the received message stored in the receive buffer R0 is saved in the buffer region B0, the thread #0 may acquire the received message from the buffer region B0 after the completion of the polling.

In a case where the above processing is completed, the thread #1 moves the entry acquired from the ready queue 115a in step S11 to the blocked queue 152a of the queuing structure Qstr #1 (step S17). Furthermore, the thread #1 stores an entry including a pointer indicating a buffer region B1 for storing the received message, in the message information queue 152b of the queuing structure Qstr #1. Therefore, the thread #1 is suspended.

FIG. 15 is a diagram illustrating a second example of state transition of a thread. After the thread #1 is suspended as illustrated in FIG. 14, the entry E1 is acquired by polling for the CQ of the QP/CQ 111a by the thread scheduler 131. Then, it is considered that a received message including the XID "1" is acquired from a receive buffer R1 indicated by the acquired entry E1 (step S21).

The thread scheduler 131 refers to the XID-Qstr correspondence table 112 and specifies the queuing structure Qstr #1 corresponding to the XID "1" (step S22). The thread scheduler 131 acquires an entry from the message information queue 152b of the queuing structure Qstr #1 and writes the received message stored in the receive buffer R1, into a buffer region B1 indicated by the acquired entry (step S23). Furthermore, the thread scheduler 131 retrieves an entry from the blocked queue 152a of the queuing structure Qstr #1 and moves the entry to the ready queue 115a (step S24).

Therefore, the thread #1 is wake-up. That is, in a case where the moved entry is acquired by the thread scheduler 131 and execution of the thread #1 is started, the thread #1 may continue processing using the received message written in the buffer region B1.

As in the examples of FIGS. 14 and 15, in this embodiment, a thread which fails once in polling for the CQ is suspended without polling any more. Thereafter, by polling for the CQ by the thread scheduler or another thread, an entry corresponding to the suspended thread is acquired from the CQ, thereby waking-up the suspended thread.

With such a mechanism, a thread, which fails in polling and is suspended, is not wake-up until a requested message is received. Therefore, the thread, which fails in polling, is not wake-up and suspended repeatedly for polling again, thereby reducing the number of occurrences of unnecessary context switching. As a result, the processing efficiency of the CPU may be improved.

With the above mechanism, an entry addressed to a thread stored in the CQ is acquired not only by polling by the thread but also by polling by another thread or thread scheduler. The received message corresponding to the acquired entry may be used by the destination thread. This reduces a probability that an entry addressed to any thread may not be acquired in a case where polling is performed. As a result, it is possible to reduce the number of unnecessary polling so that the utilization efficiency of resources such as a CPU and a memory is improved.

Flowchart

Next, the processing of the node 100 is described with reference to a flowchart.

Figure 16:
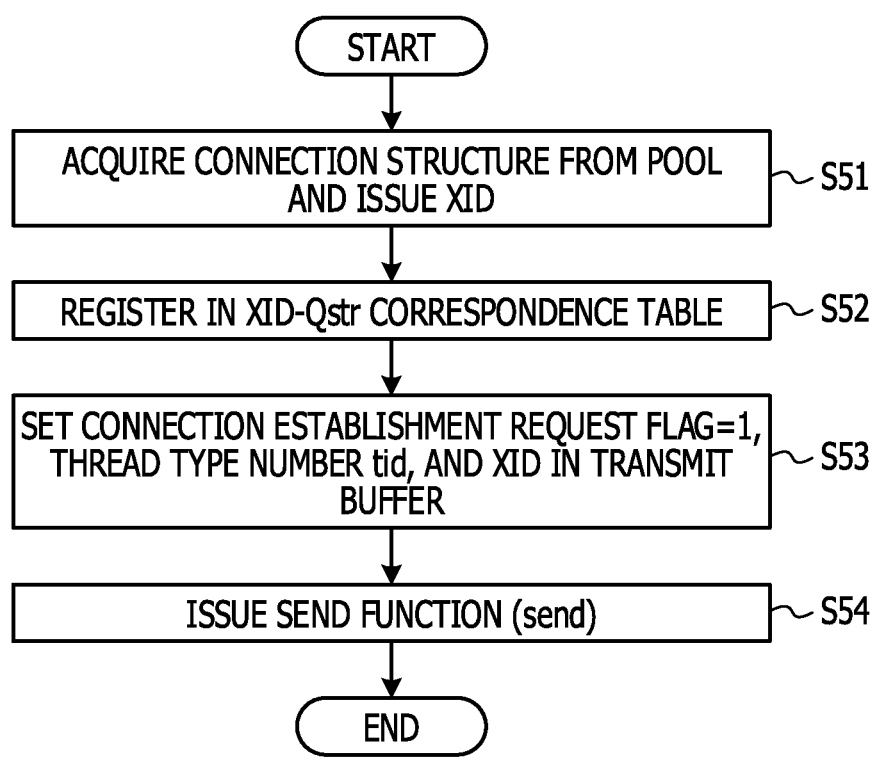
FIG. 16 is a flowchart illustrating an example of a processing procedure to request connection establishment between threads.

FIG. 16 is a flowchart illustrating an example of a processing procedure to request connection establishment between threads. Herein, as an example, a case that the thread #11 of the node 100-1 establishes a connection with the thread #21 of the node 100-2 is illustrated.

Step S51

The thread #11 acquires an unused connection structure 151 from the connection pool 113. At this time, an unused queuing structure 152 is also acquired. The thread #11 registers the thread #11 as its own node side thread and the thread #21 as the other node side thread with respect to the acquired connection structure 151. The thread #11 registers a pointer to the QP/CQ 111a used for communication with the node 100-2 and a pointer to the acquired queuing structure 152 with respect to the acquired connection structure 151.

Furthermore, the thread #11 issues a new XID and registers the XID in the acquired connection structure 151. The XID is calculated by combining the number of the node 100-1 and a value obtained by adding "1" to the immediately preceding issued sequential number. Herein, it is considered that the XID "11" is issued for simplicity of explanation.

Step S52

The thread #11 newly registers a record including the issued the XID "11" and information indicating the acquired queuing structure 152 in the XID-Qstr correspondence table 112.

Step S53

The thread #11 sets a connection establishment request flag, a thread type number tid indicating the type of the thread #21 of the communication partner, and the XID "11" in the transmit buffer. The connection establishment request flag is set to "1" indicating a connection establishment request.

Step S54

The thread #11 issues a send function "send" to the HCA driver 140. At this time, the thread #11 sets a pointer to the connection structure 151 and an address of the transmit buffer as arguments.

Therefore, an entry indicating a transmission request for connection establishment is registered in the QP of the QP/CQ 111a. Upon acquiring this entry, the HCA driver 140 transmits the information set in the transmit buffer to the node 100-2. Therefore, the newly issued XID "11" is transmitted to the node 100-2 of the partner.

Figure 17:
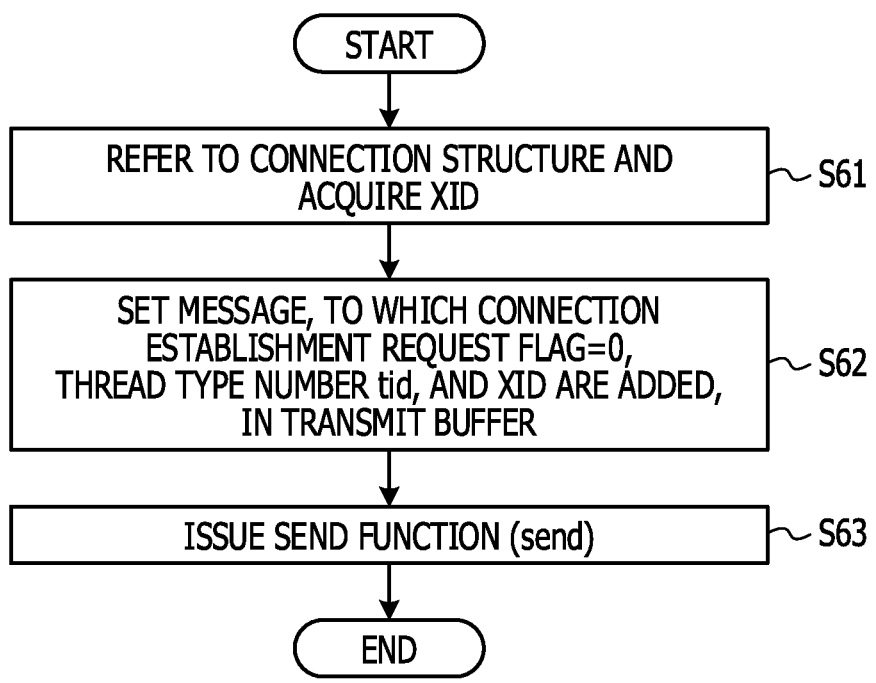
FIG. 17 is a flowchart illustrating an example of a processing procedure to request transmission of a message.

FIG. 17 is a flowchart illustrating an example of a processing procedure to request transmission of a message. Herein, as an example, a case that the thread #11 transmits a message to the thread #21, after the connection with the thread #21 is established by the processing of FIG. 16, is illustrated.

Step S61

The thread #11 refers to the connection structure 151, in which the thread #11 is registered as its own node side thread and the thread #21 is registered as the other node side thread, and acquires the XID "11" from the connection structure 151.

Step S62

The thread #11 sets, in the transmit buffer, a transmitted message to which the connection establishment request flag, the thread type number tid indicating the type of the thread #21 of the communication partner, and the XID "11" are added. The connection establishment request flag is set to "0" indicating no connection establishment request.

Step S63

The thread #11 issues a send function "send" to the HCA driver 140. At this time, the thread #11 sets a pointer to the connection structure 151 and an address of the transmit buffer as arguments.

Therefore, an entry indicating the transmission request of a message is registered in the QP of the QP/CQ 111a. Upon acquiring this entry, the HCA driver 140 transmits a transmitted message set in the transmit buffer to the node 100-2. Therefore, the XID "11" is transmitted to the node 100-2 of the partner together with the transmitted message.

Figure 18:
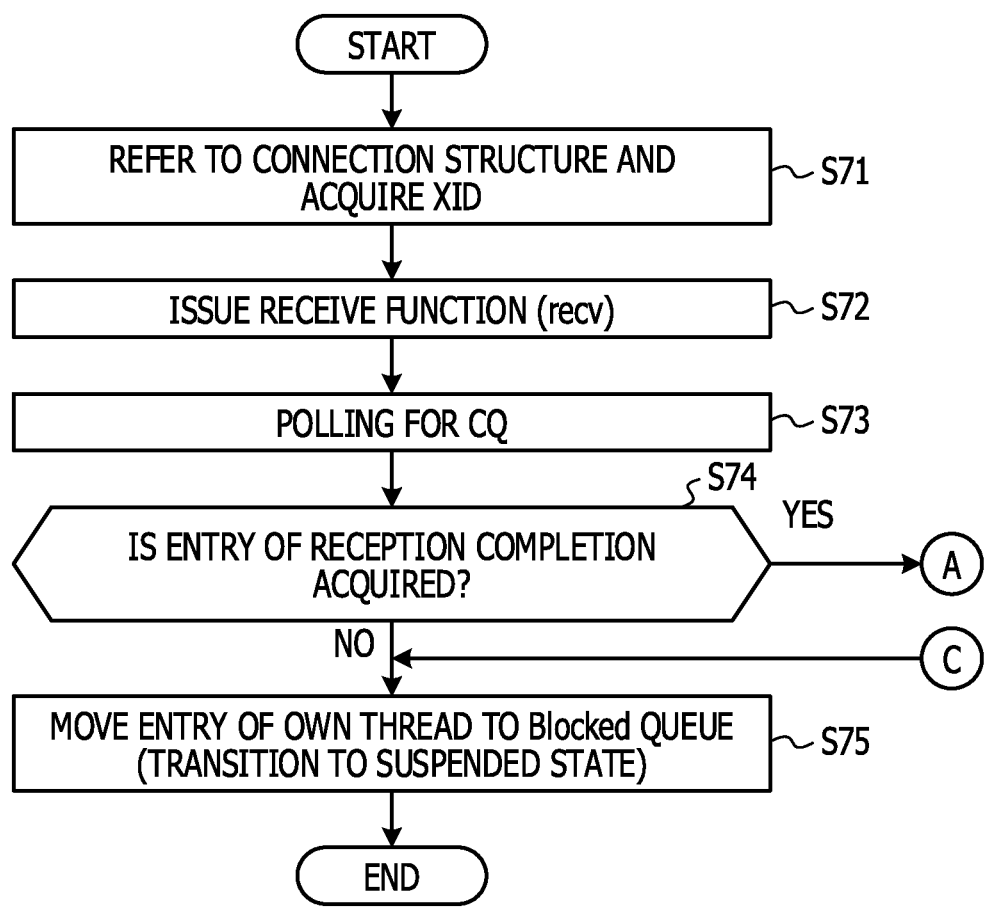
FIG. 18 is a flowchart (part 1) illustrating an example of a processing procedure to request reception of a message.
Figure 19:
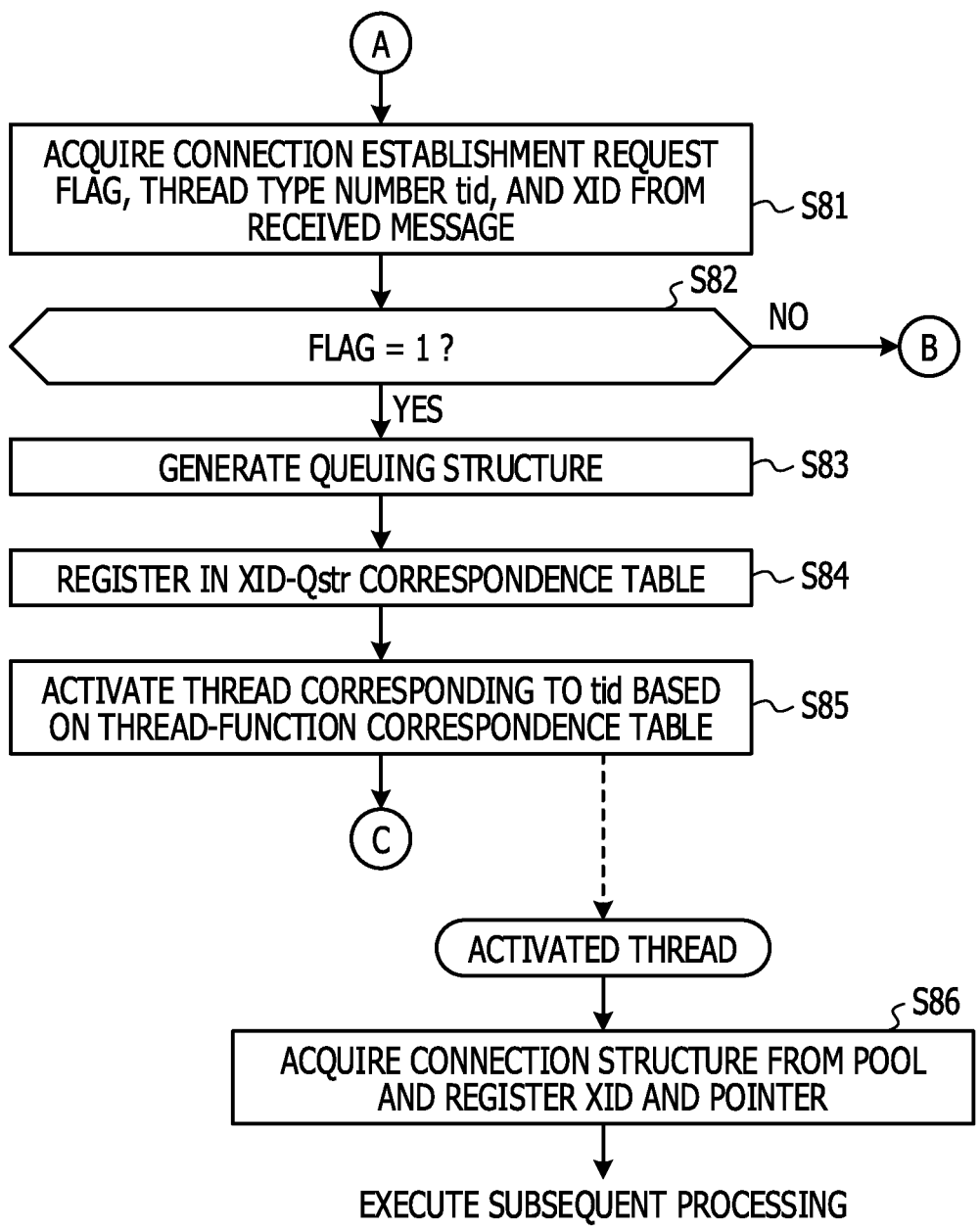
FIG. 19 is a flowchart (part 2) illustrating the example of a processing procedure to request reception of a message.
Figure 20:
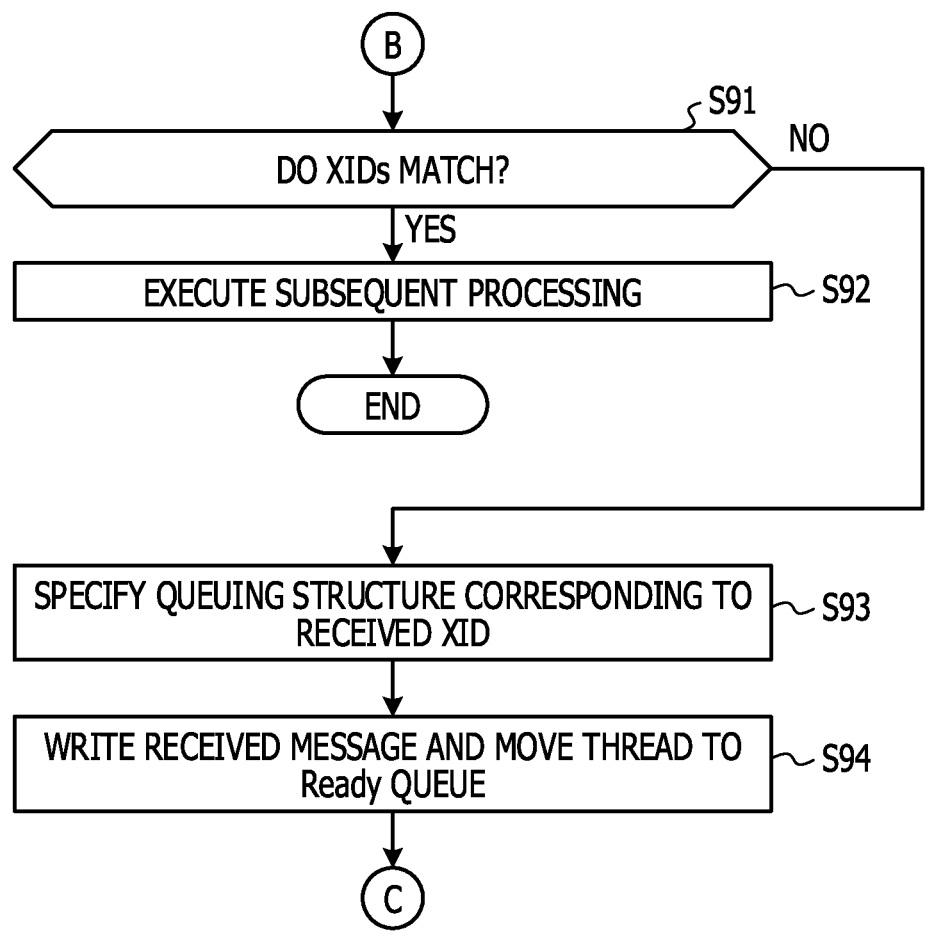
FIG. 20 is a flowchart (part 3) illustrating the example of a processing procedure to request reception of a message.

FIGS. 18 to 20 are flowcharts illustrating an example of a processing procedure to request reception of a message. Herein, as an example, a case where the thread #22 of the node 100-2 receives a message transmitted from the thread #12 of the node 100-1 is illustrated. It is considered that a connection between the thread #12 and the thread #22 has been established, and the XID "12" is assigned to this connection.

Step S71

The thread #22 refers to the connection structure 151, in which the thread #22 is registered as its own node side thread and the thread #12 is registered as the other node side thread, and acquires the XID "12" from the connection structure 151.

Step S72

The thread #22 issues a receive function "recv" to the HCA driver 140. At this time, thread #22 sets a pointer to the connection structure 151 referred to in step S71 and an address of the receive buffer as arguments.

Therefore, an entry indicating the reception request of the message is registered in the QP of the QP/CQ 111a. Upon acquiring this entry, the HCA driver 140 receives the message from the node 100-2 and sets the message in the receive buffer. The HCA driver 140 registers an entry indicating reception completion in the CQ of the QP/CQ 111a. However, at the time of execution of the next step S73, this entry is not limited to be registered in the CQ.

Step S73

The thread #22 issues, to the HCA driver 140, a function for polling the CQ for communication with the node 100-1, that is, the CQ of the QP/CQ 111a. Therefore, polling for the CQ is performed.

Step S74

As a result of the polling, the thread #22 determines whether an entry indicating reception completion could be acquired from the CQ. In a case where the entry may be acquired, the thread #22 executes processing in step S81 of FIG. 19, and in a case where the entry may not be acquired, the thread #22 executes processing in step S75.

The entry acquired in step S74 may not indicate the reception completion corresponding to the reception request in step S72.

In step S74, an entry indicating transmission completion may be acquired. In this case, the thread #22 wakes up the thread that made a transmission request, and then executes the processing in step S75.

Step S75

The thread #22 moves the entry corresponding to the thread #22 acquired by the thread scheduler from the ready queue, to the blocked queue 152a of the queuing structure 152. The queuing structure 152 of the movement destination is the queuing structure 152 indicated by a pointer registered in the connection structure 151 referred to in step S71.

The thread #22 stores an entry including a pointer indicating a buffer region for storing the received message, in the message information queue 152b of the queuing structure 152. Through the above processing in step S75, the thread #22 transitions to a suspended state.

Hereinafter, the description continues with reference to FIG. 19.

Step S81

The thread #22 acquires the received message corresponding to the entry acquired in step S74, from the receive buffer in which a message received by the HCA driver 140 is stored. The thread #22 acquires a connection establishment request flag, a thread type number tid, and an XID from the received message.

Step S82

In a case where the connection establishment request flag is "1", the thread #22 executes processing in step S83, and in a case where the connection establishment request flag is "0", the thread #22 executes processing in step S91 of FIG. 20.

Step S83

In a case where the connection establishment request flag is "1", it is requested to newly establish a connection between threads. Herein, as an example, it is described that establishment of a connection between thread #11 and thread

21 is requested by processing of FIG. 16. In this case, the received message includes the XID "11".

Firstly, the thread #22 generates a new queuing structure 152.

Step S84

The thread #22 newly registers a record including the XID "11" acquired from the received message and the pointer indicating the queuing structure 152 generated in step S83, in the XID-Qstr correspondence table 112.

Step S85

The thread #22 refers to the thread-function correspondence table 114, and specifies the thread #21 associated with the thread type number tid acquired from the received message. The thread #22 activates the specified thread #21. After this, the thread #22 executes processing in step S75 in FIG. 18 and transitions to the suspended state.

Step S86

The thread #21 activated in step S85 acquires the unused connection structure 151 from the connection pool 113. The thread #21 registers the thread #21 as its own node side thread and the thread #11 as the other node side thread with respect to the acquired connection structure 151. The thread #21 registers the XID acquired from the received message in step S81, in the acquired connection structure 151. Furthermore, the thread #21 registers a pointer to the QP/CQ 111a used for communication with the node 100-1 and a pointer to the queuing structure 152 generated in step S83. Therefore, a connection between the thread #11 and the thread #21 is established.

After this, the activated thread #21 executes subsequent processing under the control of the thread scheduler.

Hereinafter, the description continues with reference to FIG. 20.

Step S91

In a case where the connection establishment request flag is "0" in step S82 of FIG. 19, the entry acquired from the CQ is an entry indicating reception completion. The thread #22 determines whether the XID acquired from the received message matches the XID "12" acquired in step S71 of FIG. 18. In a case where XIDs match, the entry obtained from the CQ is an entry addressed to thread #22. In this case, the thread #22 executes processing in step S92. On the other hand, if the XIDs do not match, the entry acquired from the CQ is an entry addressed to any thread other than the thread #22. In this case, the thread #22 executes processing in step S93.

Step S92

The thread #22 executes subsequent processing using the acquired received message.

Step S93

The thread #22 refers to the XID-Qstr correspondence table 112, and specifies the queuing structure 152 corresponding to the XID acquired from the received message.

Step S94

The thread #22 acquires the entry from the message information queue 152b of the specified queuing structure 152, and writes the received message into the buffer region indicated by the acquired entry. Furthermore, the thread #22 retrieves an entry from the blocked queue 152a of the queuing structure 152, and moves the entry to the ready queue. In a case where the entry acquired from the CQ is addressed to, for example, a thread #23, the thread #23 is wake-up by processing in step S94.

After this, the thread #22 executes processing in step S75 of FIG. 18 and transitions to the suspended state.

Figure 21:
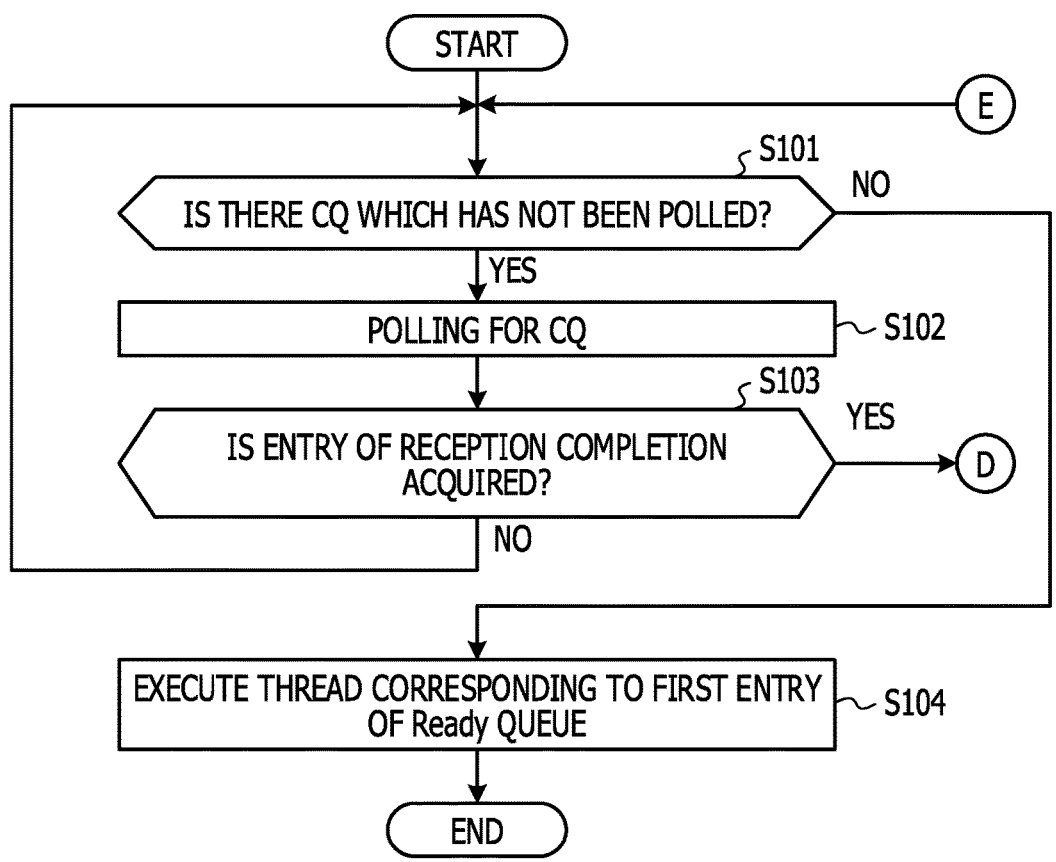
FIG. 21 is a flowchart (part 1) illustrating an example of a processing procedure of a thread scheduler.
Figure 22:
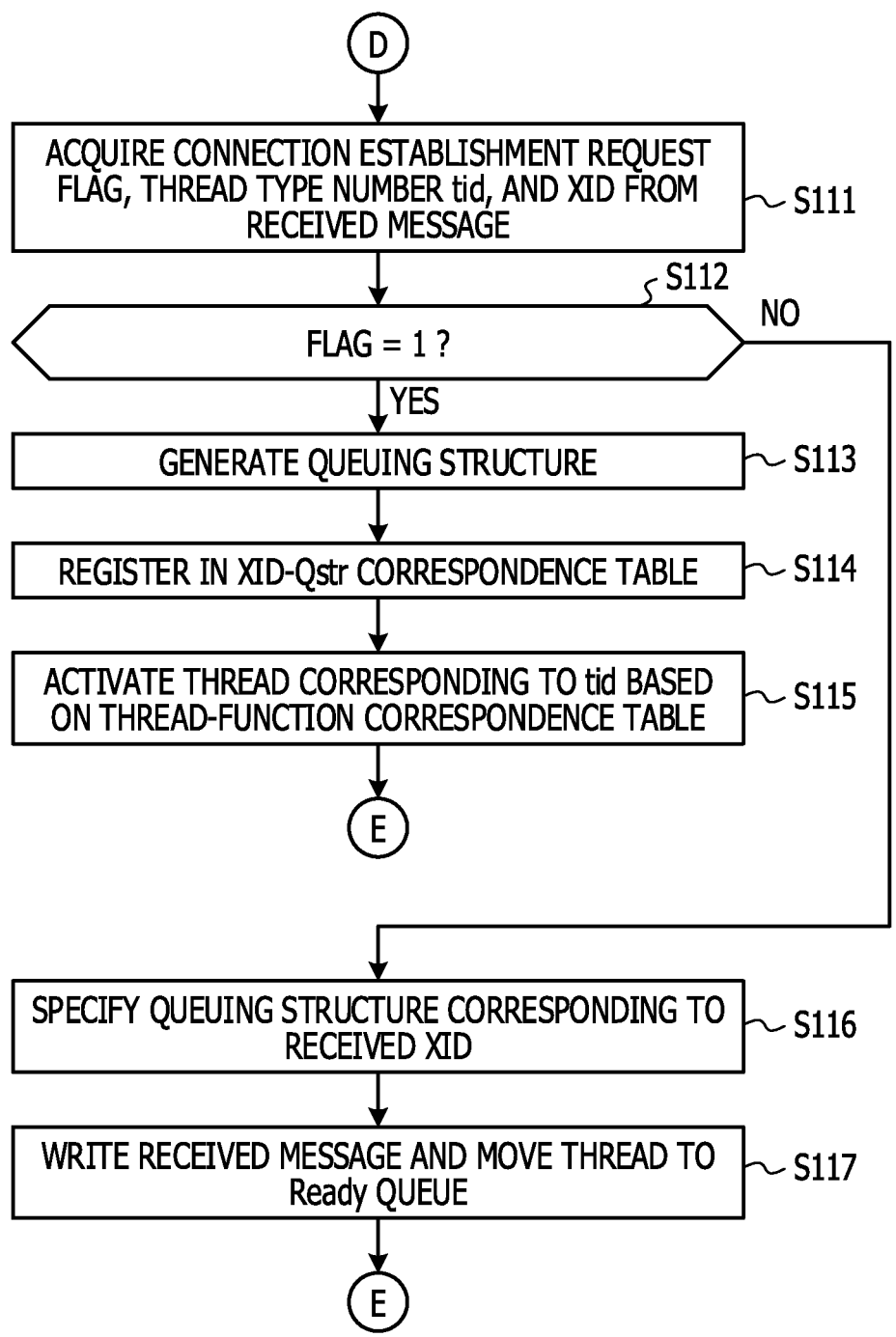
FIG. 22 is a flowchart (part 2) illustrating the example of a processing procedure of a thread scheduler.

FIGS. 21 and 22 are flowcharts illustrating an example of the processing procedure of the thread scheduler. Herein, as an example, the processing of the thread scheduler 131 of the node 100-2 is illustrated. FIGS. 21 and 22 are repeatedly executed.

Step S101

The thread scheduler 131 determines whether there is a CQ which has not been polled among the CQs of the node 100-2. In a case where there is a CQ which is not polled, the thread scheduler 131 executes processing in step S102, and in a case where polling for the entire CQs is completed, the thread scheduler 131 executes processing in step S104.

Step S102

The thread scheduler 131 performs polling for the CQs which are not polled.

Step S103

The thread scheduler 131 determines whether an entry indicating reception completion may be acquired from the CQ as a result of polling. In a case where the entry may be acquired, the thread scheduler 131 executes processing in step S111 of FIG. 22, and in a case where the entry may not be acquired, the thread scheduler 131 executes processing in step S101.

Step S104

The thread scheduler 131 acquires a first entry from the ready queue 115a and starts execution of a thread corresponding to the entry.

Hereinafter, the description continues with reference to FIG. 22.

Step S111

The thread scheduler 131 acquires the received message corresponding to the entry acquired in step S103 of FIG. 21, from the receive buffer in which the message received by the HCA driver 140 is stored. The thread scheduler 131 acquires the connection establishment request flag, the thread type number tid, and the XID from the received message.

Step S112

In a case where the connection establishment request flag is "1", the thread scheduler 131 executes processing in step S113, and in a case where the connection establishment request flag is "0", the thread scheduler 131 executes processing in step S116.

Step S113

In a case where the connection establishment request flag is "1", it is requested to newly establish a connection between threads. Herein, as an example, it is described that establishment of a connection between thread #11 and thread #21 is requested by processing of FIG. 16. In this case, the received message includes the XID "11".

Firstly, the thread scheduler 131 newly generates the queuing structure 152.

Step S114

The thread scheduler 131 newly registers a record including the XID "11" acquired from the received message and a pointer indicating the queuing structure 152 generated in step S113, in the XID-Qstr correspondence table 112.

Step S115

The thread scheduler 131 refers to the thread-function correspondence table 114, and specifies the thread #21 associated with the thread type number tid acquired from the received message. The thread scheduler 131 activates the specified thread #21. Hereinafter, the thread scheduler 131 executes processing in step S101 of FIG. 21.

Step S116

The thread scheduler 131 refers to the XID-Qstr correspondence table 112, and specifies the queuing structure 152 corresponding to the XID acquired from the received message.

Step S117

The thread scheduler 131 acquires an entry from the message information queue 152b of the specified queuing structure 152, and writes the received message into the buffer region indicated by the acquired entry. Furthermore, the thread scheduler 131 retrieves the entry from the blocked queue 152a of the queuing structure 152 and moves the entry to the ready queue. In a case where the entry acquired from the CQ is, for example, addressed to the thread #23, the thread #23 is wake-up by processing in step S117.

Hereinafter, the thread scheduler 131 executes processing in step S101 of FIG. 21.

Specific Example of Thread

Next, a specific processing example of the thread is described.

Figure 23:
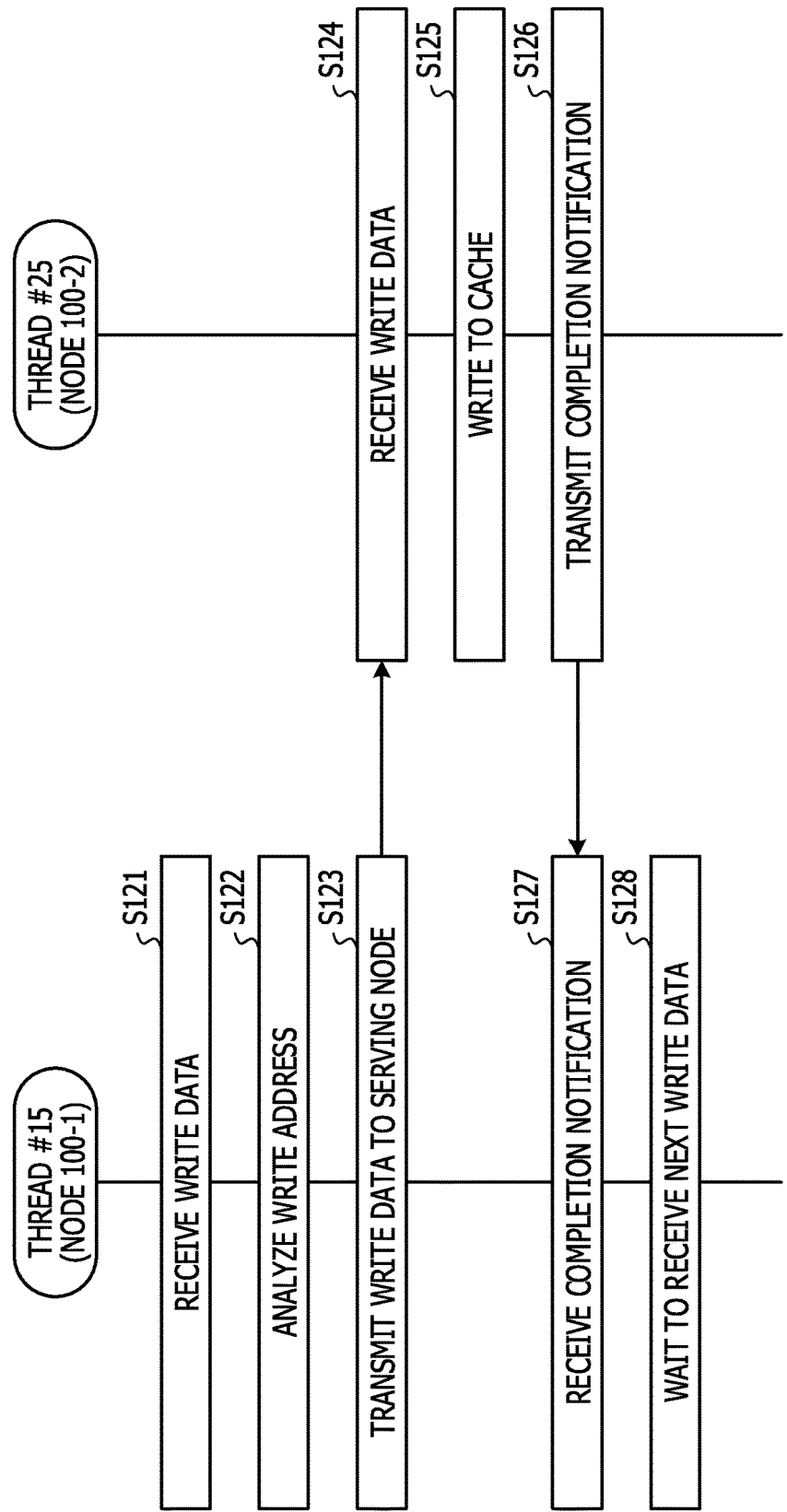
FIG. 23 is a diagram illustrating a processing example of a thread.

FIG. 23 is a diagram illustrating a processing example of a thread. In the example of FIG. 23, it is considered that a connection has been established between the thread #15 of the node 100-1 and the thread #25 of the node 100-2. The thread #15 is a thread that accepts a write request from the host apparatus, and the thread #25 is a thread in the "serving node", which is in charge of storing write data, that accepts write data transferred from another node.

Step S121

The thread #15 receives the write request and the write data from the host apparatus.

Step S122

The thread #15 analyzes the write address and determines the node 100-2 as the serving node.

Step S123

The thread #15 transmits the write data to the node 100-2 which is a serving node.

Step S124

The thread #25 receives the write data.

Step S125

The thread #25 writes the received write data to the cache.

Step S126

The thread #25 transmits completion notification of writing to the node 100-1.

Step S127

The thread #15 receives the completion notification and notifies the host apparatus that the writing is completed.

Step S128

The thread #15 enters a state of waiting to receive the next write data.

In the above processing, for example, the thread #25 issues a receive function "recv" to receive the write data in step S124, and subsequently polls for the CQ. In a case where the thread #25 has failed to acquire an entry addressed to thread #25 itself by polling, the thread #25 is suspended and enter a state of waiting for reception. Thereafter, in a case where the write data, to which the XID corresponding to the connection between the thread #15 and the thread #25 is added, is received, another thread or the thread scheduler on the node 100-2 acquires an entry addressed to the thread #25 from the CQ by polling. Then, the thread #25 is wake-up, acquires the received write data, and starts execution of processing subsequent to step S125.

Through such processing, in a case where the thread #25 has failed to acquire the write data by polling, the thread #25 is suspended and does not be wake-up until the reception of the write data is completed. Therefore, the number of suspended and wake-up times of the thread #25 is reduced and the occurrence of context switching is suppressed, and as a result, the utilization efficiency of the CPU on the node 100-2 is improved.

On the other hand, for example, after the write data transmission in step S123 is completed, the thread #15 issues a receive function "recv" to receive the completion notification in step S127, and then polls for the CQ. If the thread #15 fails to acquire an entry addressed to itself by polling, the thread #15 is suspended and waits for reception. Thereafter, in a case where a completion notification with XID added corresponding to the connection between the thread #15 and the thread #25 is received, an entry from the CQ to the thread #15 is acquired by polling of another thread or the thread scheduler on the node 100-1. Then, the thread #15 is wake-up, acquires the received completion notification, and starts execution of processing subsequent to step S128.

Through such processing, the thread #15 suspends if it fails to acquire completion notification by polling and does not wake up until reception of the completion notification is completed. Therefore, the number of suspended and wake-up times of the thread #15 is reduced and the occurrence of context switching is suppressed, and as a result, the utilization efficiency of the CPU on the node 100-1 is improved.

The processing functions of the apparatuses (for example, the information processing apparatuses 1 and 2, the nodes 100, and 100-1 to 100-4) illustrated in each of the above embodiments may be implemented by a computer. In that case, there is provided a program describing the processing contents of functions that each apparatus includes, and by executing the program by the computer, the processing functions are implemented on the computer. The program describing the processing contents may be recorded in a computer-readable recording medium. The computer-readable recording medium includes a magnetic storage device, an optical disk, a magneto-optical recording medium, a semiconductor memory, and the like. The magnetic storage device includes a hard disk apparatus (HDD), a flexible disk (FD), a magnetic tape, and the like. The optical disk includes a digital versatile disc (DVD), DVD-RAM, a compact disc-read only memory (CD-ROM), CD-Recordable (R)/Rewritable (RW) and the like. The magneto-optical recording medium includes a magneto-optical disk (MO) and the like.

In the case of distributing the program, for example, there is sold a portable recording medium such as DVD, CD-ROM or the like in which the program is recorded. The program may be stored in the storage device of a server computer, and the program may be transmitted via the network from the server computer to another computer.

The computer that executes the program, for example, stores the program recorded in the portable recording medium or the program transmitted from the server computer in its own storage device. Then, the computer reads the program from its own storage device and executes processing according to the program. The computer may read the program directly from the portable recording medium and execute the processing according to the program. Each time the program is transmitted from a server computer connected via a network, the computer may sequentially execute processing according to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a memory that stores correspondence information, the correspondence information indicating a correspondence between a plurality of first identifiers and a plurality of combinations of one of a plurality of first threads and one of a plurality of second threads, respectively, the plurality of first threads running on the information processing apparatus, the plurality of second threads running on another information processing apparatus; and
a processor coupled to the memory and the processor configured to execute a process, the process including:
storing, into a queue, a completion notification corresponding to received data upon a reception of the received data, the received data including a second identifier indicating a combination of transmission source thread among the plurality of second threads and a destination thread among the plurality of first threads;
retrieving the completion notification stored in the queue;
specifying, upon the retrieving, a third thread among the plurality of first threads based on the second identifier included in the received data and the correspondence information; and
transmitting the received data to the third thread.

2. The information processing apparatus according to claim 1, wherein
the retrieving is performed after a reception of data in which a transmission source is a fifth thread, among the plurality of second threads, is requested by a fourth thread among the plurality of first threads; and
the process further comprises:
causing the fourth thread to become a waiting state when a first received data is retrieved in the retrieving and when the second identifier included in the first received data does not match the first identifier corresponding to a combination of the fourth thread and the fifth thread;
transmitting a second received data to the fourth thread when the second received data is retrieved after the causing and when the second identifier included in the second received data matches the first identifier corresponding to a combination of the fourth thread and the fifth thread; and
causing the fourth thread to become an execution state.

3. The information processing apparatus according to claim 1, wherein the process further comprises:
controlling an execution order of the plurality of first threads; and
retrieving the completion notification from the queue periodically.

4. The information processing apparatus according to claim 1, wherein
when a plurality of other information processing apparatuses, each of which is the other information processing apparatus, are coupled to the information processing apparatus, a plurality of queues corresponding to each of the plurality of the other information processing apparatuses are implemented.

5. The information processing apparatus according to claim 4, wherein
upon an establishment of a connection between one first thread among the plurality of first threads and one second thread among the plurality of second threads is established, the first identifier corresponding to the connection is generated by combining an identification number indicating at least one of the information processing apparatus on which the one first thread is executed and any one of the other information processing apparatuses on which the one second thread is executed, and a sequentially generated number.

6. An information processing method executed by a computer, the information processing method comprising:
retrieving correspondence information from a memory, the correspondence information indicating a correspondence between a plurality of first identifiers and a plurality of combinations of one of a plurality of first threads and one of a plurality of second threads, respectively, the plurality of first threads running on the information processing apparatus, the plurality of second threads running on another information processing apparatus; and
storing, into a queue, a completion notification corresponding to received data upon a reception of the received data, the received data including a second identifier indicating a combination of transmission source thread among the plurality of second threads and a destination thread among the plurality of first threads;
retrieving the completion notification stored in the queue;
specifying, upon the retrieving, a third thread among the plurality of first threads based on the second identifier included in the received data and the correspondence information; and
transmitting the received data to the third thread.

7. A non-transitory computer-readable storage medium storing a program that causes a computer to execute a process, the process comprising:
retrieving correspondence information from a memory, the correspondence information indicating a correspondence between a plurality of first identifiers and a plurality of combinations of one of a plurality of first threads and one of a plurality of second threads, respectively, the plurality of first threads running on the information processing apparatus, the plurality of second threads running on another information processing apparatus; and
storing, into a queue, a completion notification corresponding to received data upon a reception of the received data, the received data including a second identifier indicating a combination of transmission source thread among the plurality of second threads and a destination thread among the plurality of first threads;
retrieving the completion notification stored in the queue;
specifying, upon the retrieving, a third thread among the plurality of first threads based on the second identifier included in the received data and the correspondence information; and
transmitting the received data to the third thread.

* * * * *